US012402142B2

(12) United States Patent
Elshafie et al.

(10) Patent No.: US 12,402,142 B2
(45) Date of Patent: Aug. 26, 2025

(54) ADAPTIVE CONFIGURED GRANT ALLOCATION PARAMETERS FOR ENERGY HARVESTING DEVICES AND XR APPLICATIONS

(71) Applicant: QUALCOMM Incorporated, San Diego, CA (US)

(72) Inventors: Ahmed Elshafie, San Diego, CA (US); Diana Maamari, San Diego, CA (US); Huilin Xu, Temecula, CA (US); Yuchul Kim, San Diego, CA (US); Linhai He, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 18/050,001

(22) Filed: Oct. 26, 2022

(65) Prior Publication Data

US 2024/0147483 A1    May 2, 2024

(51) Int. Cl.
*H04W 72/23* (2023.01)
*H04L 5/00* (2006.01)

(52) U.S. Cl.
CPC ........... *H04W 72/23* (2023.01); *H04L 5/0048* (2013.01)

(58) Field of Classification Search
CPC . H04W 72/23; H04W 92/18; H04W 52/0216; H04W 52/0245; H04W 52/0248; H04W 72/21; H04W 72/11; H04L 5/0048; H04L 5/0053; H04L 5/0094
See application file for complete search history.

(56) References Cited

U.S. PATENT DOCUMENTS

| | | | |
|---|---|---|---|
| 2010/0113058 A1* | 5/2010 | Wu | H04W 72/02 |
| | | | 455/452.1 |
| 2016/0014665 A1* | 1/2016 | Centonza | H04W 36/304 |
| | | | 455/436 |
| 2016/0119847 A1* | 4/2016 | Park | H04W 36/22 |
| | | | 455/438 |
| 2020/0036497 A1* | 1/2020 | Xu | H04W 72/23 |
| 2020/0296656 A1* | 9/2020 | Amuru | H04L 1/1896 |
| 2021/0100013 A1* | 4/2021 | Khoshnevisan | H04L 1/0061 |
| 2021/0281369 A1* | 9/2021 | Awad | H04L 5/0005 |
| 2022/0201605 A1* | 6/2022 | Yang | H04W 52/0235 |
| 2022/0209906 A1* | 6/2022 | Han | H04L 1/1896 |
| 2023/0044648 A1* | 2/2023 | Centonza | H04W 36/22 |
| 2023/0068245 A1* | 3/2023 | Khoshnevisan | H04W 72/54 |
| 2024/0147430 A1 | 5/2024 | Elshafie et al. | |

* cited by examiner

*Primary Examiner* — Afshawn M Towfighi
(74) *Attorney, Agent, or Firm* — Procopio, Cory, Hargreaves & Savitch LLP

(57) ABSTRACT

An apparatus may be configured to transmit a first indication of a maximum number of active periodic resource sets of a plurality of periodic resource sets at the wireless device, transmit, based on a power-related characteristic of the wireless device, a second indication of a set of configuration parameters associated with the plurality of periodic resource sets that are activated during a first time period, and receive, based on the first indication and the second indication, a third indication of an activation and a configuration for at least one periodic resource set of the plurality of periodic resource sets.

30 Claims, 13 Drawing Sheets

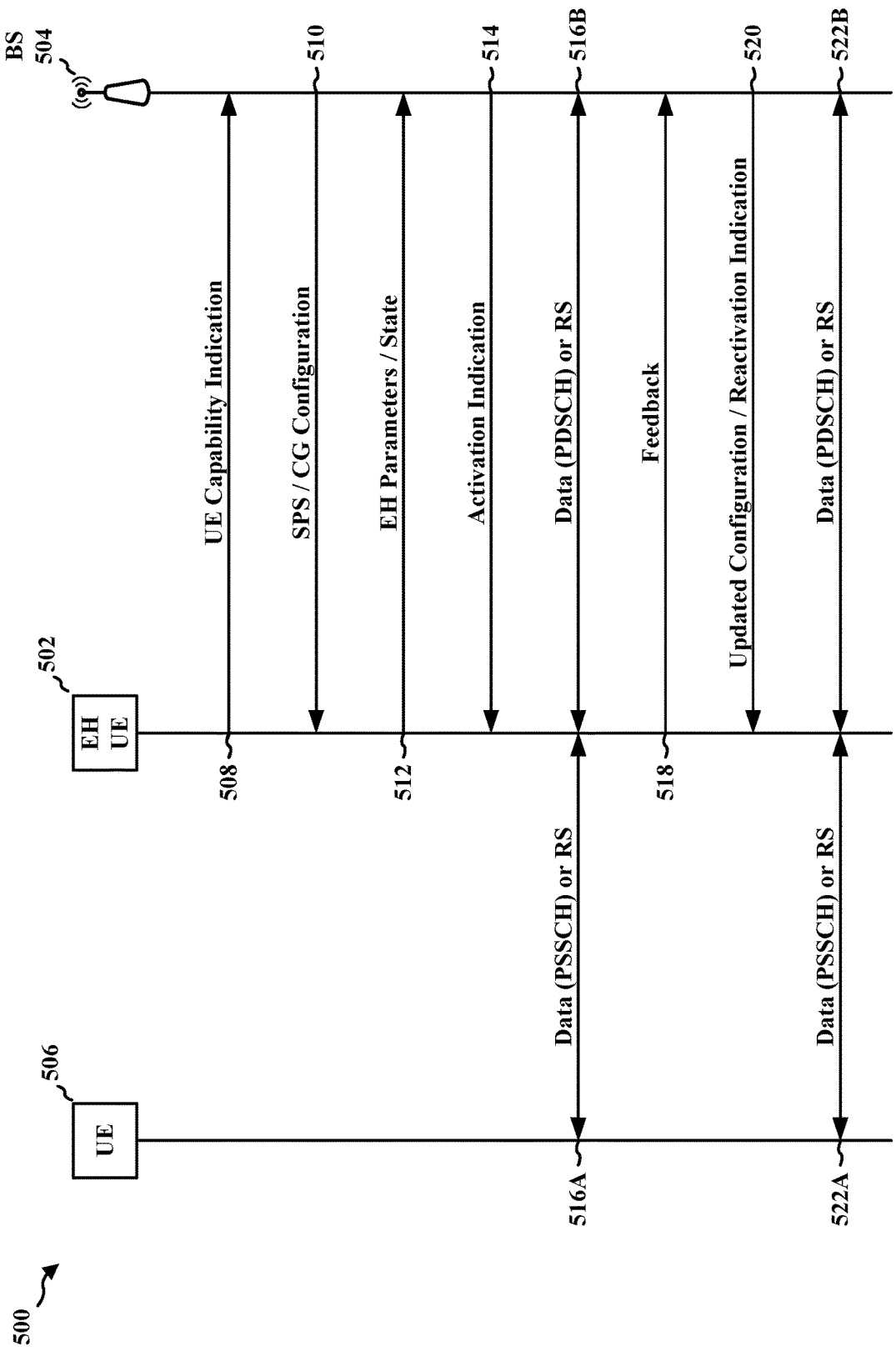

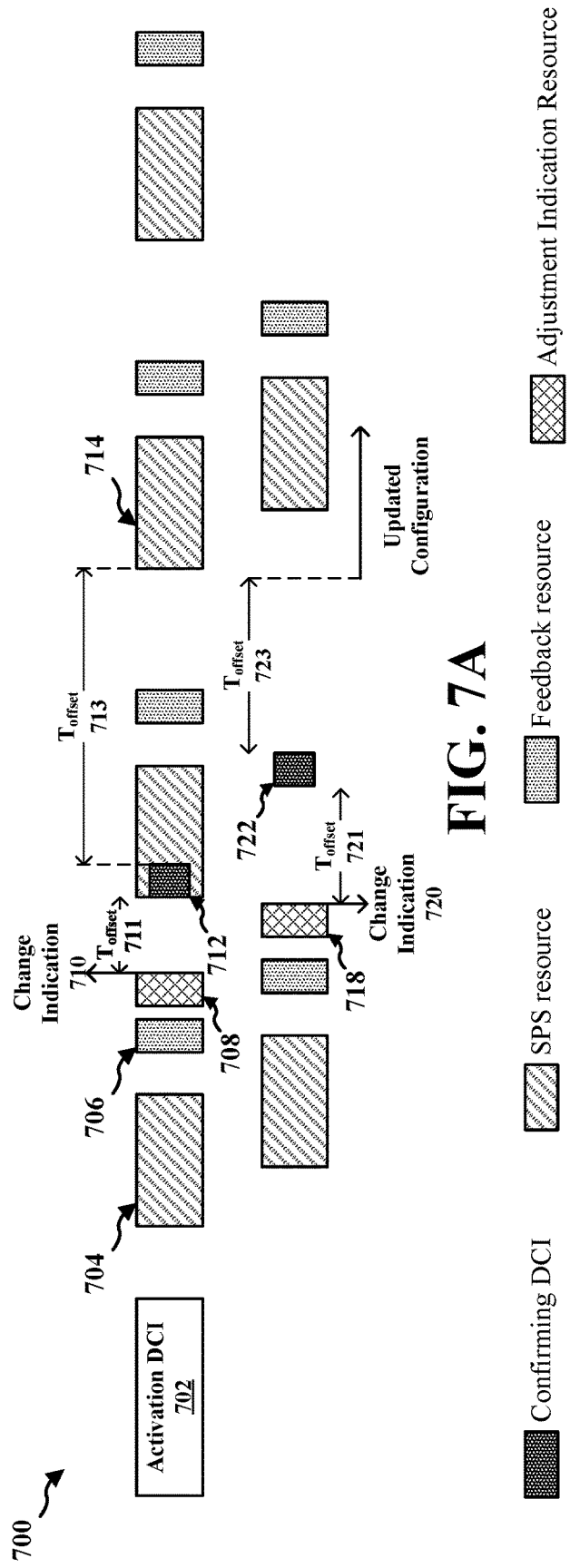
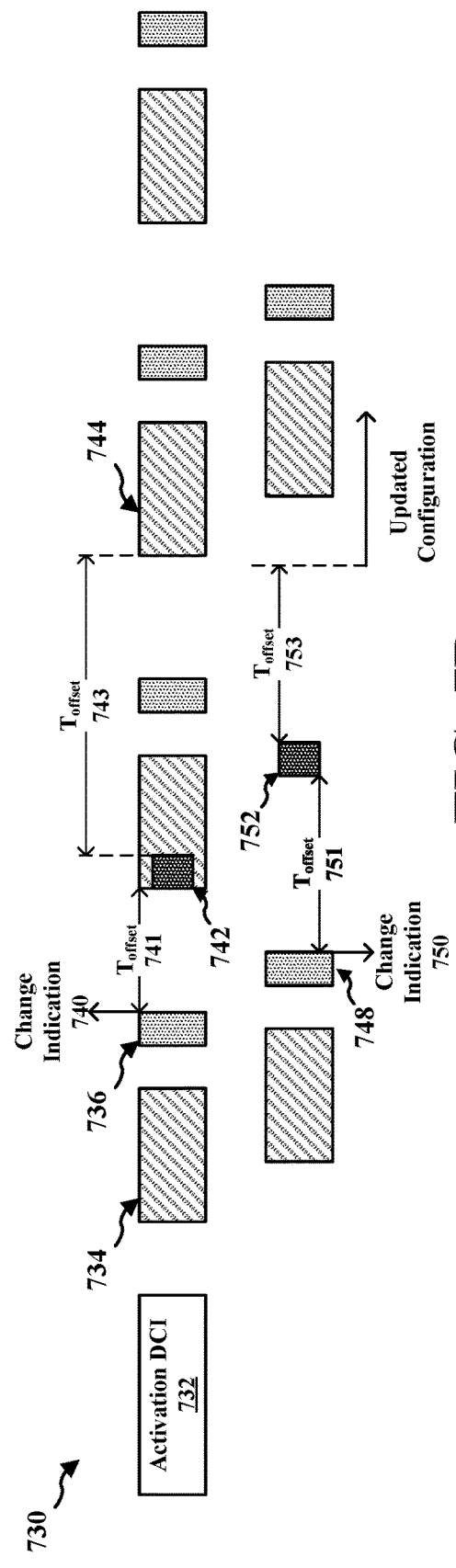
FIG. 7A
FIG. 7B

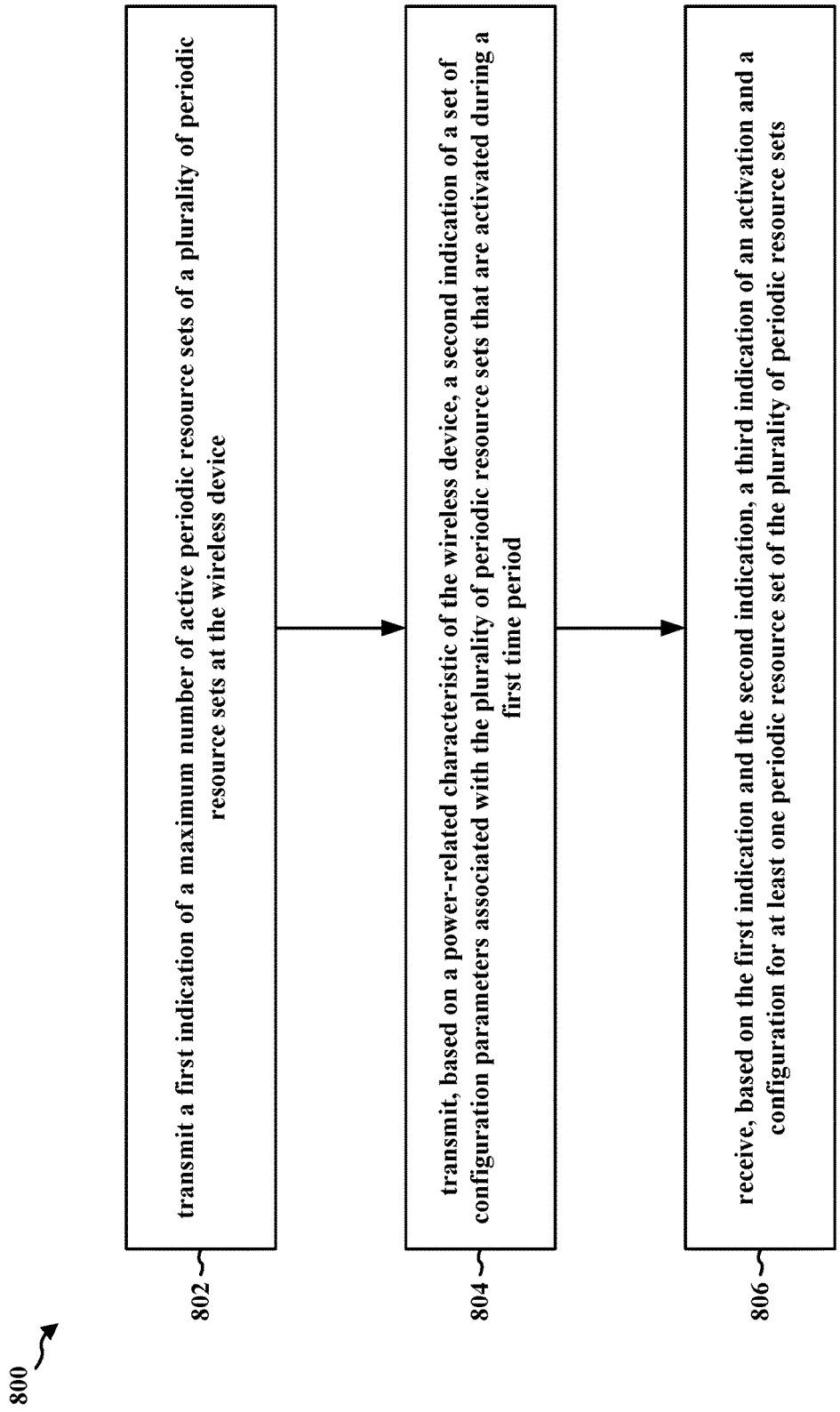

ADAPTIVE CONFIGURED GRANT ALLOCATION PARAMETERS FOR ENERGY HARVESTING DEVICES AND XR APPLICATIONS

TECHNICAL FIELD

The present disclosure relates generally to communication systems, and more particularly, to a communication systems involving energy harvesting (EH) wireless devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to transmit a first indication of a maximum number of active periodic resource sets of a plurality of periodic resource sets at the wireless device. The apparatus may be configured to transmit, based on a power-related characteristic of the wireless device, a second indication of a set of configuration parameters associated with the plurality of periodic resource sets that are activated during a first time period. The apparatus may be configured to receive, based on the first indication and the second indication, a third indication of an activation and a configuration for at least one periodic resource set of the plurality of periodic resource sets.

In an aspect of the disclosure, a method, a computer-readable medium, and an apparatus are provided. The apparatus may be a first wireless device configured to receive a first indication of a maximum number of active periodic resource sets of a plurality of periodic resource sets at a second wireless device. The apparatus may be configured to receive, based on a power-related characteristic of the second wireless device, a second indication of a set of configuration parameters associated with the plurality of periodic resource sets that are activated during a first time period. The apparatus may be configured to transmit, based on the first indication and the second indication, a third indication of an activation and a configuration for at least one periodic resource set of the plurality of periodic resource sets.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a call flow diagram illustrating a communication between an EH UE and a base station for allocating resources for communication with at least one of the base station and an additional UE in accordance with some aspects of the disclosure.

FIG. 7A is a diagram illustrating a plurality of active periodic resource sets being updated in accordance with some aspects of the disclosure.

FIG. 7B is a diagram illustrating a plurality of active periodic resource sets being updated in accordance with some aspects of the disclosure.

FIG. 8 is a flowchart of a method of wireless communication.

DETAILED DESCRIPTION

Figure 1:
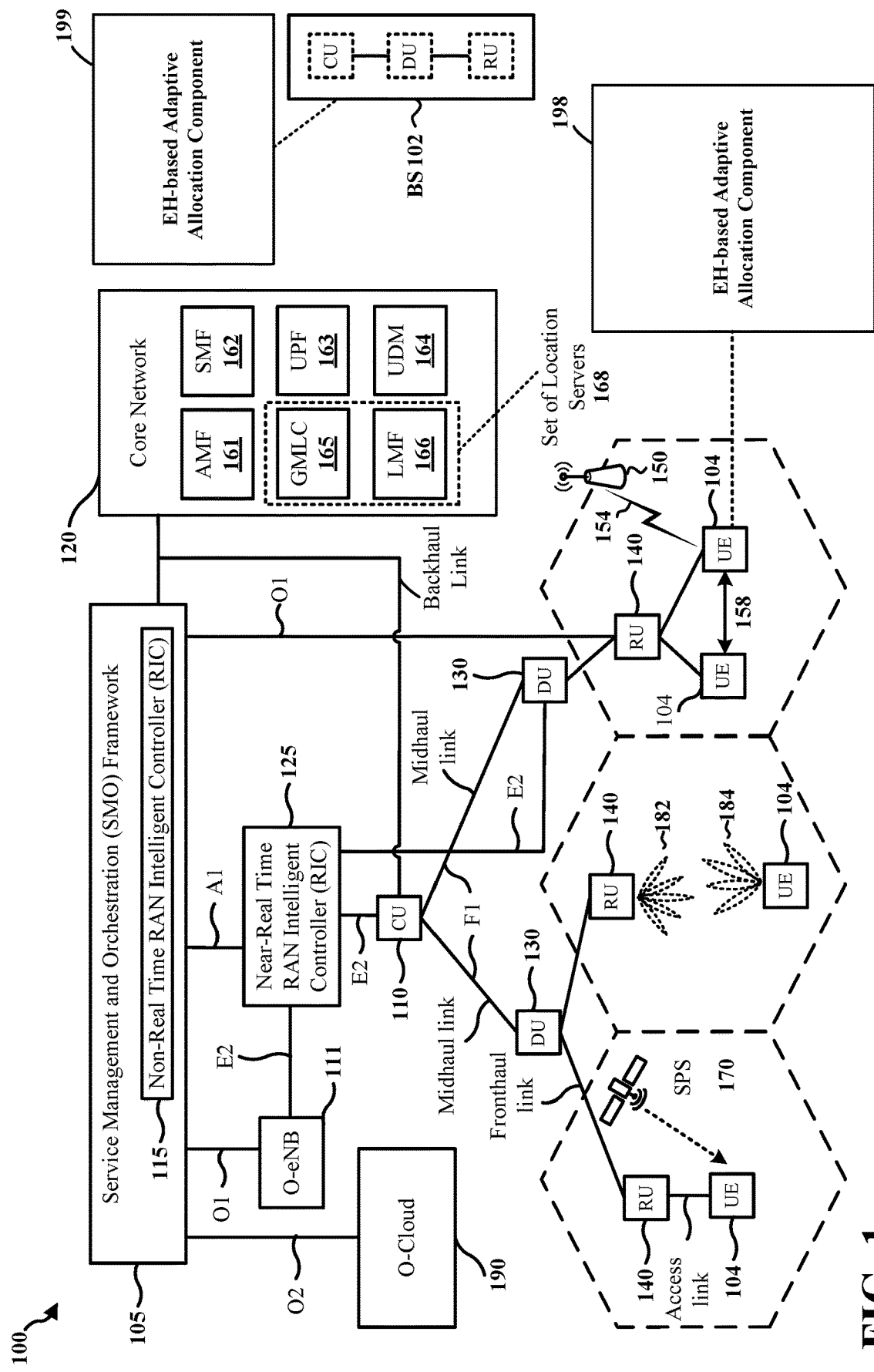
FIG. 1 is a diagram illustrating an example of a wireless communications system and an access network.

In some aspects of wireless communication, e.g., 5G NR, a wireless device may be capable of harvesting energy. For example, an energy harvesting wireless device may be configured to harvest and store one or more of solar energy, thermal (heat) energy, and/or ambient radio frequency (RF) energy. The energy harvested by a wireless device, in some aspects, may be inconsistent such that during a first time period an energy harvesting rate may be a first rate and during a second time period may be a different (e.g., higher or lower) energy harvesting rate. The operation of the wireless device, in some aspects, may be associated with a discharging rate (e.g., a rate at which energy is consumed by the wireless device). The power consumption, in some aspects, may be associated with power consuming RF components such as an analog to digital converter (ADC), a mixer, and/or oscillators. A method and apparatus providing opportunities for feedback from a UE or other EH wireless device regarding a current EH state (e.g., based on changing EH rates, energy discharging rates, or amount of stored energy) to provide dynamic control capabilities to adjust resources associated with a communication between a EH UE and a base station or other UE based on a change to the current EH state.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an EH-based adaptive allocation component 198 configured to transmit a first indication of a maximum number of active periodic resource sets of a plurality of periodic resource sets at the wireless device, transmit a second indication of a set of configuration parameters associated with the plurality of periodic resource sets that are activated during a first time period based on a power-related characteristic of the wireless device, and receiving a third indication of an activation and a configuration for at least one periodic resource set of the plurality of periodic resource sets based on the first indication and the second indication. In certain aspects, the EH-based adaptive allocation component 198 may be configured to is configured to receive a first indication of a maximum number of active periodic resource sets of a plurality of periodic resource sets at a second wireless device, receive a second indication of a set of configuration parameters associated with the plurality of periodic resource sets that are activated during a first time period based on a power-related characteristic of the second wireless device, and transmit a third indication of an activation and a configuration for at least one periodic resource set of the plurality of periodic resource sets based on the first indication and the second indication. In certain aspects, the base station 102 may include an EH-based adaptive allocation component 199 configured to receive a first indication of a maximum number of active periodic resource sets of a plurality of periodic resource sets at a second wireless device, receiving a second indication of a set of configuration parameters associated with the plurality of periodic resource sets that are activated during a first time period based on a power-related characteristic of the second wireless device, and transmit a third indication of an activation and a configuration for at least one periodic resource set of the plurality of periodic resource sets based on the first indication and the second indication. Although the following description may be focused on 5G NR, the concepts described herein may be applicable to other similar areas, such as LTE, LTE-A, CDMA, GSM, and other wireless technologies.

Figure 2:
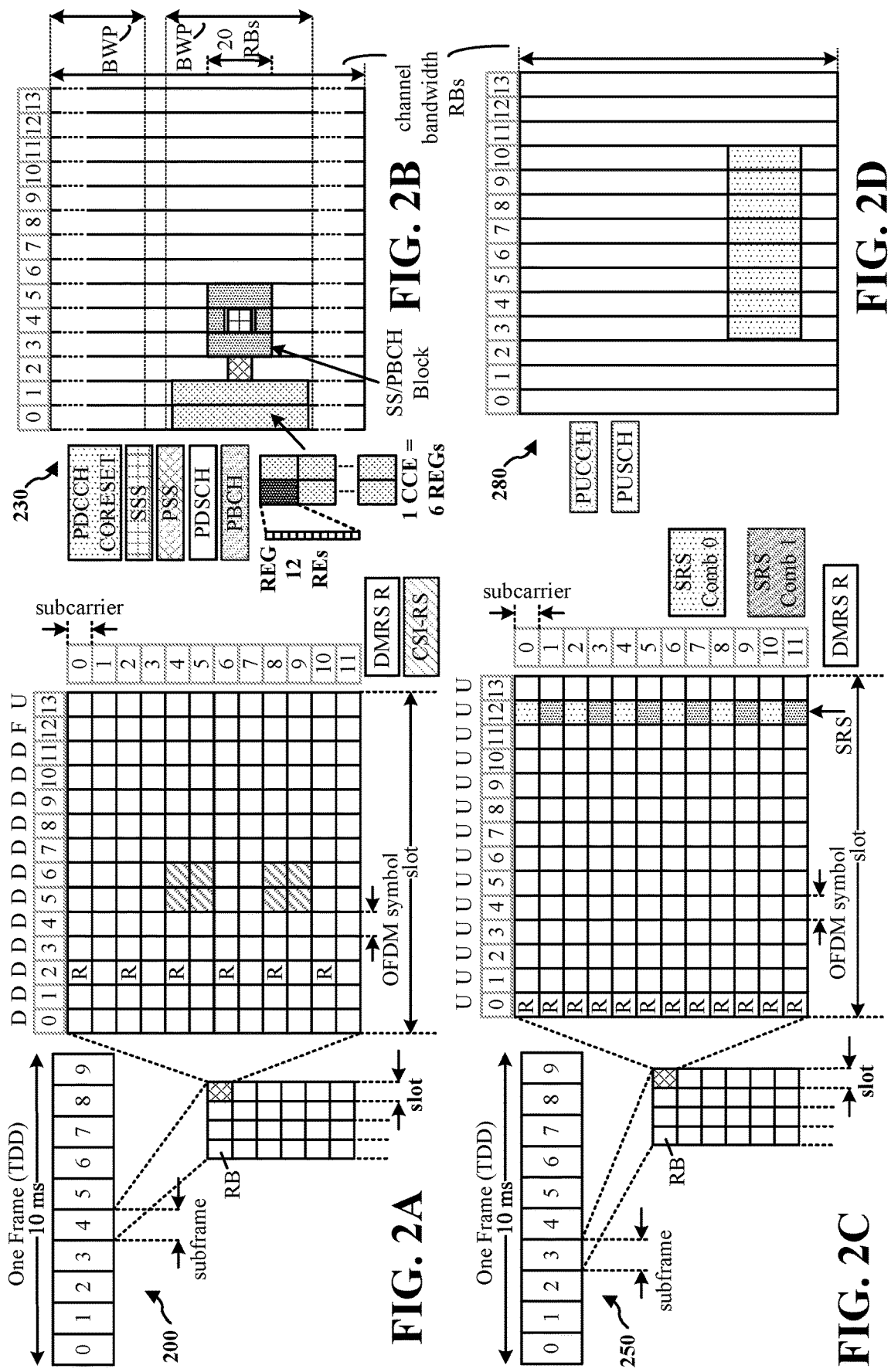
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
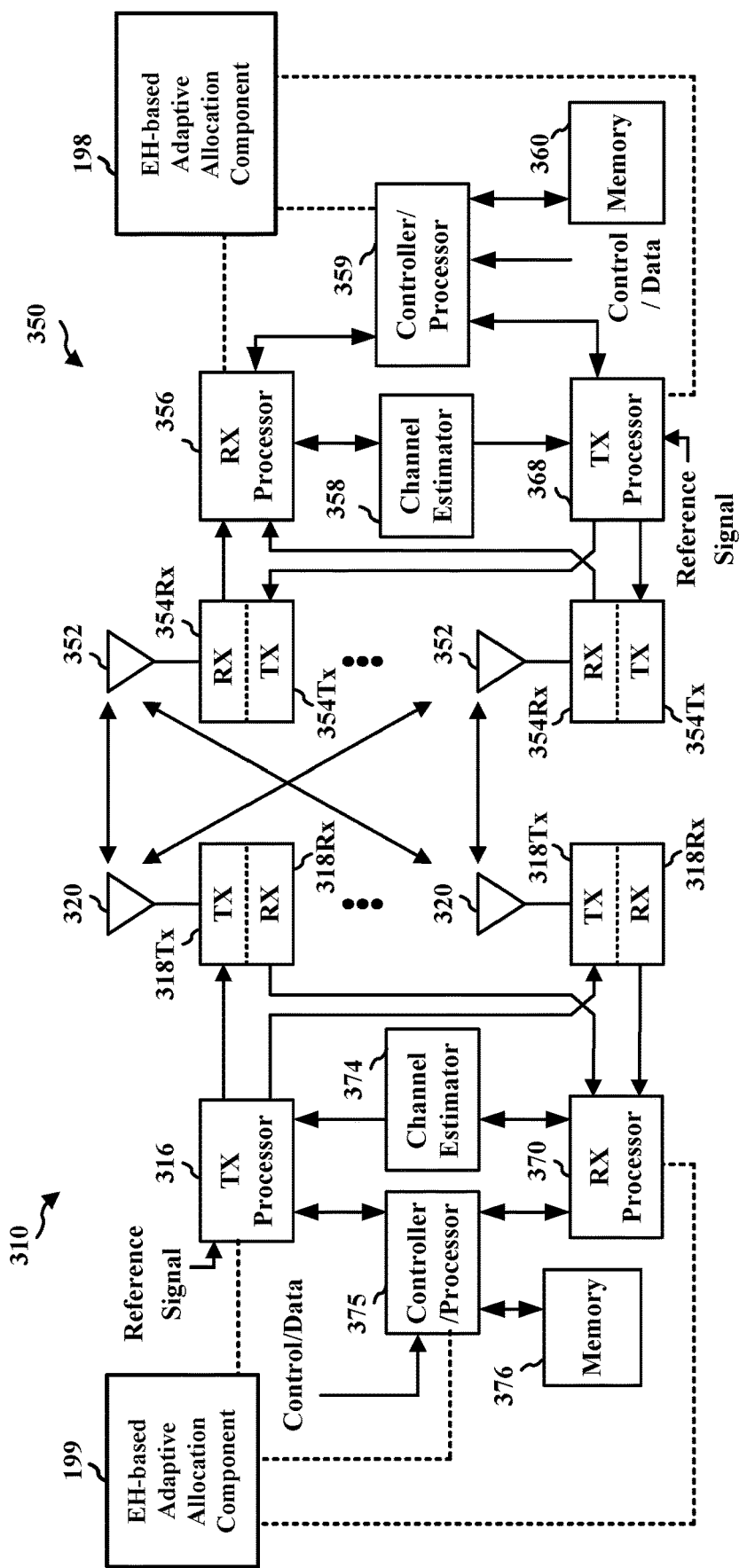
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the adaptive allocation component 198 of FIG. 1.

At least one of the TX processor 316, the RX processor 370, and the controller/processor 375 may be configured to perform aspects in connection with the adaptive allocation component 199 of FIG. 1.

In some aspects of wireless communication, e.g., 5G NR, a wireless device may be capable of harvesting energy. For example, an energy harvesting wireless device may be configured to harvest and store one or more of solar energy, thermal (heat) energy, and/or ambient RF energy. The energy harvested by a wireless device, in some aspects, may be inconsistent such that during a first time period an energy harvesting rate may be a first rate and during a second time period may be a different (e.g., higher or lower) energy harvesting rate. The operation of the wireless device, in some aspects, may be associated with a discharging rate (e.g., a rate at which energy is consumed by the wireless device). The power consumption, in some aspects, may be associated with power consuming RF components such as an ADC, a mixer, and/or oscillators.

Figure 4A:
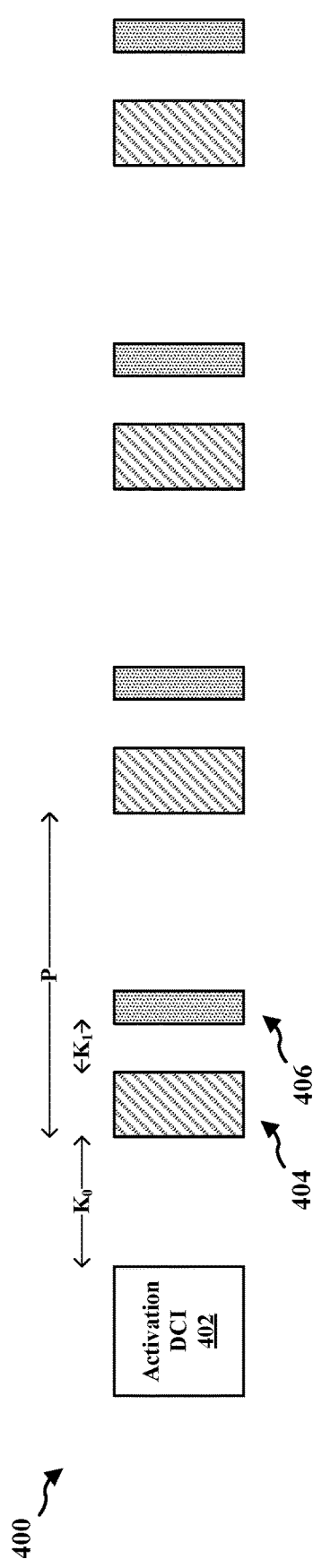
FIG. 4A is a diagram illustrating a set of periodic resources (e.g., a periodic resource set such as a semi-persistent scheduling resource set or a configured grant).

FIG. 4A is a diagram 400 illustrating a set of periodic resources (e.g., a periodic resource set such as a semi-persistent scheduling resource set or a configured grant). The periodic resource set may be associated with a periodicity, P, of resources (e.g., a group of resources 404) in the periodic resource set. The periodic resource set, in some aspects, may include feedback resources (e.g., feedback resources 406) associated with an offset, $K_1$, that defines a time between an end of a resource group (e.g., the group of resources 404) and a beginning of an associated feedback resource (e.g., feedback resources 406). The periodic resource set, in some aspects, may be one periodic resource set in a plurality of periodic resource sets configured via RRC signaling or via a MAC-CE. A particular periodic resource set, in some aspects, may be activated via (activation) DCI 402.

Figure 4B:
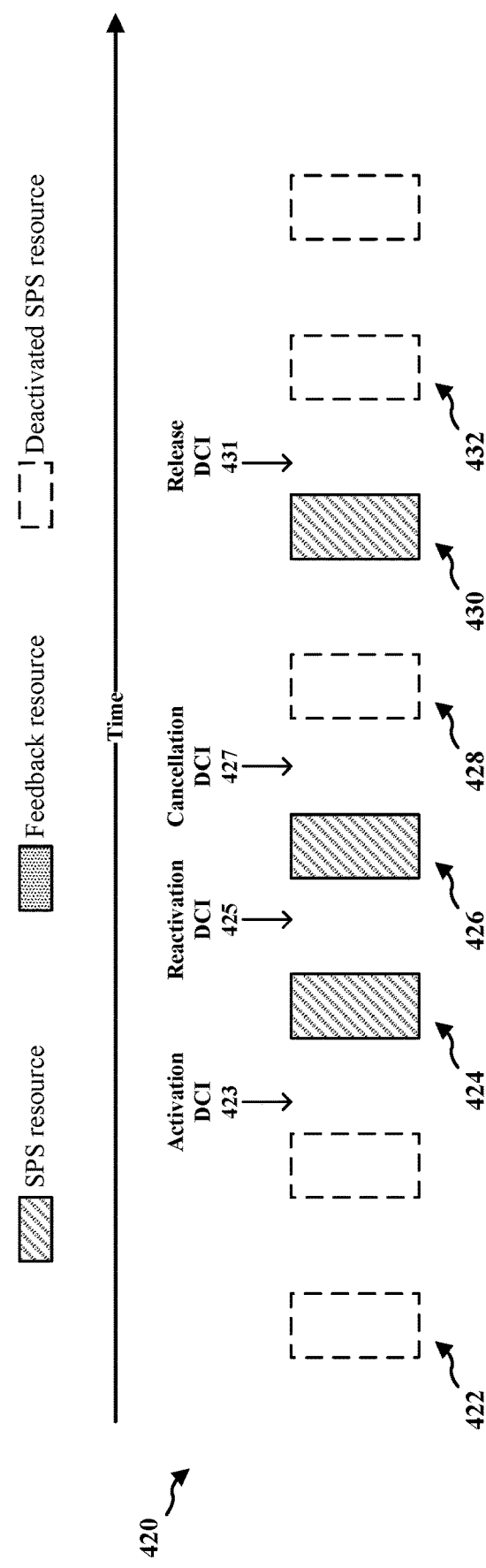
FIG. 4B is a diagram illustrating resource groups in a periodic resource set being activated, reactivated (or reconfigured), canceled, or released in accordance with some aspects of the disclosure.

FIG. 4B is a diagram 420 illustrating resource groups in a periodic resource set being activated, reactivated (or reconfigured), canceled, or released in accordance with some aspects of the disclosure. For example, at a first time, a periodic resource set including a resource group 422, resource group 424, resource group 426, resource group 428, resource group 430, and resource group 432 may not yet be activated. At a later time, an activation DCI 423 activating the periodic resource set may be transmitted by a base station and received by a UE.

The activation DCI 423 may include configuration information (e.g., an indication) for a set of parameters including one or more of a number of time and/or frequency resources (e.g., REs or RBs), a size of a transport block, or a modulation and coding scheme (MCS). For example, the activation DCI 423 may include a value associated with one or more parameters in the set of parameters. Each value included, or indicated, in the activation DCI 423 may be associated with a particular number of time and/or frequency resources (e.g., REs or RBs), a particular size of a transport block, or a particular MCS based on a known, or configured, set of possible values. In some aspects, parameters in the set of parameters may be configured based on a default value. Accordingly, the resource group 424 may be active based on activation DCI 423.

A subsequent reactivation DCI 425 may be transmitted by the base station and received by the UE. The reactivation DCI 425 may include an indication of a set of updated parameters. The set of updated parameters, in some aspects, may include a subset of the parameter set configured in the activation DCI 423. Accordingly, the resource group 426 may be associated with a different configuration than the resource group 424. The updated configuration may be based on changing circumstances at the UE, e.g., a changing energy harvesting rate, discharging rate, or energy storage.

The base station may transmit and the UE may receive a cancellation DCI 427 cancelling one (or more) subsequent resource groups associated with the periodic resource set. For example, resource group 428 may be cancelled by cancellation DCI 427. A subsequent resource group (e.g., resource group 430) may be uncancelled by the cancellation DCI 427. At a later time, a release DCI 431 may release (or deactivate) the period resource set such that subsequent resource groups (e.g., resource group 432 and subsequent resource groups). While the activation, reactivation, cancellation, and release operations discussed above may allow for some level of dynamic control, a method and apparatus are provided that provide additional opportunities for feedback from a UE or other EH wireless device regarding a current EH state (e.g., based on changing EH rates, energy discharging rates, or amount of stored energy) to provide additional dynamic control capabilities to adjust resources associated with a communication between a EH UE and a base station or other UE.

FIG. 5 is a call flow diagram 500 illustrating a communication between an EH UE 502 and a base station 504 for allocating resources for communication with at least one of the base station 504 and an additional UE 506 in accordance with some aspects of the disclosure. An EH UE 502, in some aspects, may transmit, and a base station 504 may receive, a UE capability indication 508 indicating a (maximum) number of active periodic resource sets at the EH UE 502. In some aspects, the maximum number of active periodic resource sets may be based on at least one of a class or a type of the wireless device (e.g., based on an indication of a class or type of the wireless device). Active periodic resource sets, in some aspects, may be selected from a plurality of periodic resource sets configured in a previously exchanged RRC configuration. The periodic resource sets, in some aspects, may include periodic resource sets associated with different reference signals, e.g., reference signals used to sound (estimate and/or synchronize) one of a DL, UL, or SL channel. For example, the periodic resources sets may include resource sets associated with a CSI-RS (or other RS or resource used to sound the DL channel), a SRS (or other RS or resource set used to sound the UL channel), or a sidelink (SL) RS (SL-RS) (or other RS or resource set used to sound the SL channel).

In some aspects, the plurality of periodic resource sets may be configured in a semi-persistent scheduling (SPS) and/or configured grant (CG), e.g., a type 1 CG or type 2 CG, configuration based on the UE capability indication 508. For example, the base station 504 may transmit, and EH UE 502 may receive, SPS and/or CG configuration 510 including a plurality of periodic resource sets that may be activated. The SPS and/or CG configuration 510, in some aspects, may include fewer periodic resource sets than would be included in a SPS and/or CG configuration in the absence of the UE capability indication 508. In some aspects, the plurality of periodic resource sets may correspond to at least one or more of periodic reference signals, such as a CSI-RS (or other RS or resource used to sound the DL channel), a SRS (or other RS or resource set used to sound the UL channel), or a SL-RS (or other RS or resource set used to sound the SL channel) or configured grants of one or more DL resources, one or more UL resources, or one or more sidelink (SL) resources.

The capability indication 508, in some aspects, may be transmitted via layer 1 (L1) signaling, layer 2 (L2) signaling, or layer 3 (L3) signaling. For example, the capability indication 508, in some aspects, may be transmitted via one of an RRC message, a MAC-CE, or a dedicated PUCCH. Additionally, the capability indication 508, in some aspects, may be multiplexed with an L1, L2, or L3 signal. In some aspects, the UE capability indication 508 may be transmitted via information multiplexed with feedback carried on a PUCCH (e.g., feedback 518) associated with one or more DL and/or UL transmissions (e.g., data or RS 516A or data or RS 516B). The UE capability indication 508, in some aspects, may be transmitted via information multiplexed with a scheduling request (SR), information multiplexed with a buffer state information (e.g., in a BSR), information multiplexed with a random-access channel (RACH) message, or a PUSCH.

The EH UE 502, in some aspects, may transmit, and base station 504 may receive, an EH parameter and/or state indication 512. The EH parameter and/or state indication 512, in some aspects, may include an indication of a set of configuration parameters associated with activated (or activatable) periodic resource sets in the plurality of periodic resource sets. The set of configuration parameters, in some aspects, may be associated with at least one of a time-domain resource allocation, a frequency-domain resource allocation, a periodicity of a periodic resource set, a number of data ports or layers, or a set of MCS values from an MCS table. The EH parameter and/or state indication 512, in some aspects, may include an indication of a power-related characteristic of the EH UE 502 (e.g., as an example of an EH wireless device) including one or more of an energy state, a charging rate profile, or a discharging rate profile. An energy state, in some aspects, may indicate an amount of energy stored at the EH UE 502 (e.g., expressed in objective units, or in subjective units defined by the characteristics of the EH UE 502 such as a power used to send a known amount of data via a known set of time- and frequency-domain resources or a battery capacity). At least one of the charging rate profile or the discharging rate profile, in some aspects, may include at least one of a first rate value associated with a previous time period, a second rate value associated with a current time period, a third rate value associated with a subsequent time period, or a fourth rate value associated with two or more of the previous time period, the current time period, and the subsequent time period. The charging rate profile and/or discharging rate profile may indicate an expected power harvesting rate or power consumption rate based on current and/or historical function of the EH UE 502. In some aspects, the set of configuration parameters may include an association between particular values for the power-related characteristic of the EH UE 502 and particular parameters in the set of configuration parameters.

The configuration parameter associated with a time-domain resource allocation, in some aspects, may indicate a maximum number of symbols, slots, REs, or frames for an instance, or group of resources, of an active (or activatable) periodic resource set. The configuration parameter associated with a frequency-domain resource allocation, in some aspects, may be a maximum frequency range, or number of subcarriers or REs, for an instance, or group of resources, of a periodic resource set. The configuration parameter associated with a periodicity of a periodic resource set may indicate a minimum period between instances, or groups of resources, in an activated (or activatable) periodic resource set. The configuration parameter associated with a number of data ports or layers may indicate a maximum number of data ports or layers associated with an activated (or activatable) periodic resource set. The configuration parameter associated with a set of MCS values from an MCS table may indicate a maximum and/or minimum MCS value in the MCS table. The MCS table, in some aspects, may be associated with a plurality of MCS tables. The plurality of MCS tables, in some aspects, may include MCS tables corresponding to different ranges of MCS values the wireless device is capable of supporting based on the power-related characteristic of the wireless device. In some aspects, the EH parameters and/or state indication 512 may include an indication of the MCS table related to the set of configuration parameters. In some aspects, the MCS table may be a subset of a larger MCS table (e.g., an MCS table including MCS values selected from a set of MCS values in the larger MCS table).

Based on the UE capability indication 508, the SPS and/or CG configuration 510, and the EH parameter and/or state indication 512, the base station 504 may transmit, and the EH UE 502 may receive, an activation indication 514 to activate one or more periodic resource sets in the plurality of periodic resource sets configured via SPS and/or CG configuration 510. For example, referring to FIG. 4B, the activation indication 514 may correspond to the activation DCI 423 activating at least a periodic resource set including resource group 424. In some aspects, the activation indication 514 may activate multiple periodic resource sets indicated in the SPS and/or CG configuration 510. The activation indication 514 may include a configuration for each activated periodic resource set from the plurality of periodic resource sets indicated in the SPS and/or CG configuration 510. At least one periodic resource set may be configured with one or more first configuration parameters in the set of configuration parameters. As discussed above, the activated periodic resource sets may include one or more periodic resource sets associated with DL, UL, or SL communication and/or DL, UL, or SL reference signals.

Based on the activation indication 514, data or RS 516A (e.g., data or a reference signal associated with SL communication) may be exchanged between the EH UE 502 and the UE 506 and/or data or RS 516B (e.g., data or a reference signal associated with DL or UL communication) may be exchanged between the EH UE 502 and the base station 504. The data or RS 516A and/or the data or RS 516B, in some aspects, may be transmitted via the resources associated with the activated periodic resource set configured with the one or more first configuration parameters in the set of configuration parameters. The resources may be associated with, e.g., the data or RS 516A and/or the data or RS 516B may be transmitted via, a PSSCH and/or a PDSCH (or PSCCH or PDCCH), respectively, and may be associated with a feedback resource. The feedback resource, in some aspects, may be associated with a PSFCH or a PUCCH. The feedback resource for SL data (e.g., data or RS 516A) and DL data (e.g., data or RS 516B), in some aspects, may be used to transmit HARQ-ACK feedback. In some aspects, the feedback resource associated with DL data (e.g., data or RS 516B) may also be used to transmit feedback related to an EH state and/or at least one updated configuration parameter for at least one subsequent resource in the at least one periodic resource set.

The EH UE 502, in some aspects, may transmit feedback 518. Feedback 518, in some aspects, may be transmitted via the feedback resource associated with the data or RS 516B. In some aspects, the feedback 518 may be transmitted via a dedicated PUCCH or information multiplexed with feedback carried on a PUCCH associated with one or more DL transmissions (e.g., data or RS 516B). In some aspects, feedback 518 may be related to the EH state (e.g., may be independent of the reception and/or transmission of the data or RS 516B) and the feedback 518 may be included as one or more of information multiplexed with a SR, information multiplexed with a CSI report, information multiplexed with buffer state information (e.g., a BSR), information multiplexed with a random-access channel (RACH) message, or a PUSCH. In some aspects, the feedback 518 may include an indication of a difference between the at least one updated configuration parameter and at least one configuration parameter of the one or more first (e.g., current) configuration parameters. The at least one updated configuration parameter, in some aspects, may include one or more of an updated number of resources, an updated MCS, or an updated periodicity. The updated number of resources, in some aspects, may include at least one of an updated number of resource elements, an updated number of slots, an updated number of symbols, or an updated number of subcarriers. The feedback 518, in some aspects, may be configured to be implemented at a time that is at least a known, or configured, number of time units (e.g., symbols, slots, frames, etc.) after the feedback 518 is transmitted or received. The known, or configured, number of time units may be configured by the base station 504 via an RRC message, a MAC-CE, or DCI (e.g., activation indication 514) or may be indicated in the feedback 518.

The feedback 518 may be transmitted by the EH UE 502 based on a change to one or more of the energy state, the charging rate profile, or the discharging rate profile of the EH UE 502. For example, if the EH UE 502 experiences an increase in a charging rate, an indication of the increased charging rate may be included in the feedback 518. The indicated charging rate, in some aspects, may correspond to a particular value for one or more configuration parameters. For example, a value associated with an increased charging rate may be associated with one or more of a decreased period associated with one or more active periodic resource sets, an increased MCS, or an increased number of resources in each resource group of an activated periodic resource set. Similarly, if the EH UE 502 experiences a decrease in the charging rate, the feedback 518 may include an indication of the decreased charging rate that corresponds to one or more of an increased period associated with one or more active periodic resource sets, a decreased MCS, or a decreased number of resources in each resource group of an activated periodic resource set.

In some aspects, the base station 504 may transmit, and the EH UE 502 may receive, an updated configuration 520 (e.g., a reactivation indication) indicating an updated configuration based on the feedback 518. The updated configuration 520 may be transmitted by the base station 504, and received by the EH UE 502, via DCI at a known location (e.g., set of resources) within a subsequent PDSCH or within a known monitoring occasion or search space. The known location, in some aspects, may be configured using an RRC message or a MAC-CE. Based on the configuration parameters indicated and/or included in updated configuration 520, data or RS 522A (e.g., data or a reference signal associated with SL communication) may be exchanged between the EH UE 502 and the UE 506 and/or data or RS 522B (e.g., data or a reference signal associated with DL or UL communication) may be exchanged between the EH UE 502 and the base station 504. The data or RS 522A and/or the data or RS 522B, in some aspects, may be transmitted via the resources associated with the activated periodic resource set configured with the updated configuration parameters.

Figure 6:
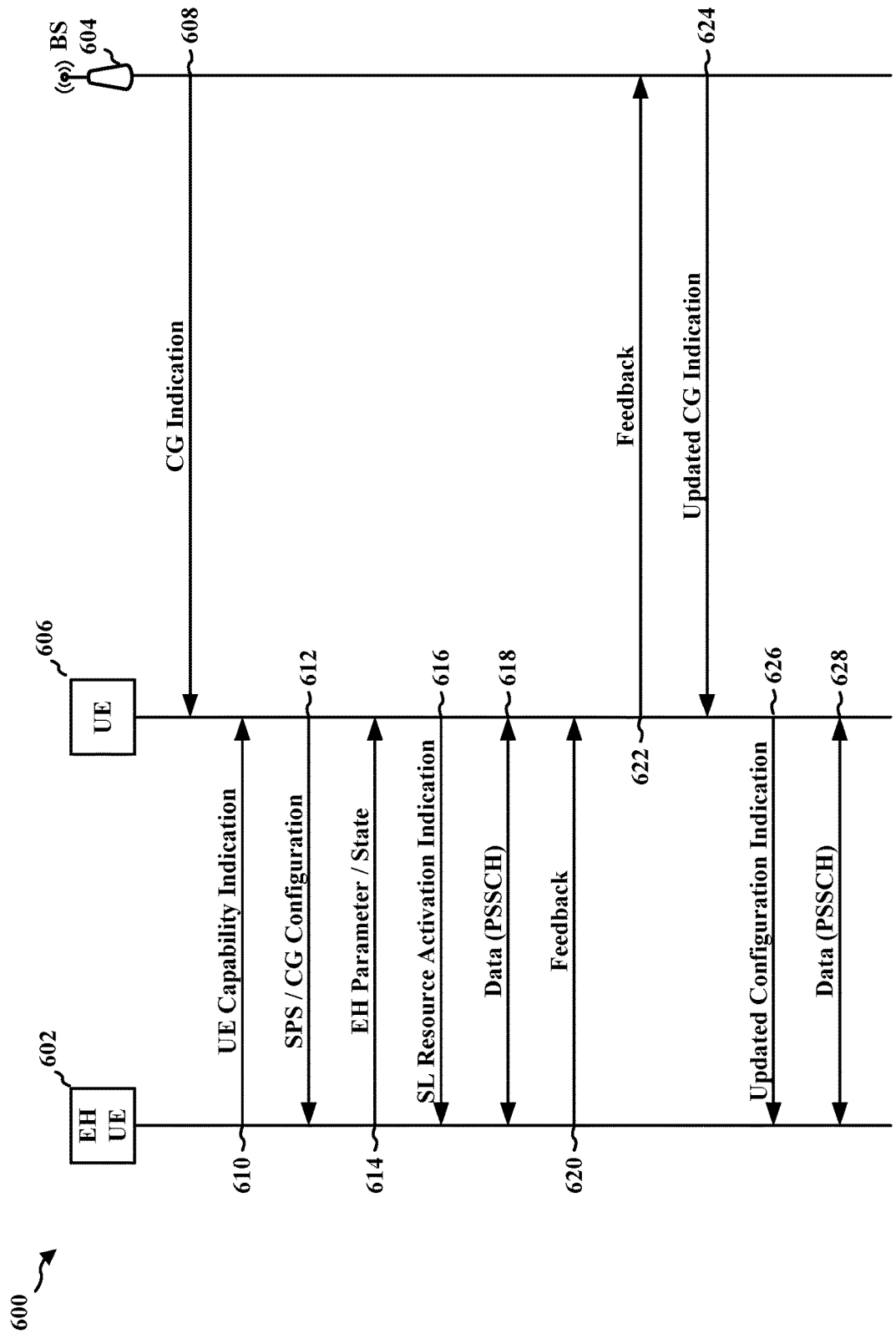
FIG. 6 is a call flow diagram illustrating a communication between an EH UE, a UE, and a base station for allocating SL resources for communication between the EH UE and the UE in accordance with some aspects of the disclosure.

FIG. 6 is a call flow diagram 600 illustrating a communication between an EH UE 602, a UE 606, and a base station 604 for allocating SL resources for communication between the EH UE 602 and the UE 606 in accordance with some aspects of the disclosure. A base station 604, in some aspects, may transmit, and UE 606 may receive, a CG indication 608 indicating a CG (e.g., a type 1 CG or a type 2 CG) or other resource allocation for SL communication associated with UE 606. An EH UE 602, in some aspects, may transmit, and a UE 606 may receive, a UE capability indication 610 indicating a (maximum) number of active periodic resource sets at the EH UE 602. In some aspects, the maximum number of active periodic resource sets may be based on at least one of a class or a type of the wireless device (e.g., based on an indication of a class or type of the wireless device). Active periodic resource sets, in some aspects, may be selected from a plurality of periodic resource sets configured in a previously exchanged RRC configuration. The periodic resource sets, in some aspects, may include periodic resource sets associated with different reference signals, e.g., reference signals used to sound (estimate and/or synchronize) a SL channel. For example, the periodic resources sets may include resource sets associated with a SL-RS (or other RS or resource set used to sound the SL channel).

In some aspects, the plurality of periodic resource sets may be configured in a SPS and/or CG, e.g., a type 1 CG or type 2 CG, configuration based on the UE capability indication 610. For example, the UE 606 may transmit, and EH UE 602 may receive, SPS and/or CG configuration 612 including a plurality of periodic resource sets that may be activated. The SPS and/or CG configuration 612, in some aspects, may include fewer periodic resource sets than would be included in a SPS and/or CG configuration in the absence of the UE capability indication 610. In some aspects, the plurality of periodic resource sets may correspond to a SL-RS (or other RS or resource set used to sound the SL channel) or configured grants for SL resources.

The capability indication 610, in some aspects, may be transmitted via one of a SL RRC message (e.g., a PC5-RRC message), a SL MAC-CE (e.g. a PC5-MAC-CE), or a dedicated physical SL feedback channel (PSFCH), a physical SL shared channel (PSSCH), a physical SL control channel (PSCCH), or information multiplexed with feedback carried on a PSFCH associated with one or more PSSCHs. In some aspects, the UE capability indication 610 may be transmitted via information multiplexed with feedback carried on a PSFCH (e.g., feedback 620) associated with one or more SL transmissions (e.g., data or RS 618).

The EH UE 602, in some aspects, may transmit, and UE 606 may receive, an EH parameter and/or state indication 614. The EH parameter and/or state indication 614, in some aspects, may include an indication of a set of configuration parameters associated with activated (or activatable) periodic resource sets in the plurality of periodic resource sets. The set of configuration parameters, in some aspects, may be associated with at least one of a time-domain resource allocation, a frequency-domain resource allocation, a periodicity of a periodic resource set, a number of data ports or layers, or a set of MCS values from an MCS table. The EH parameter and/or state indication 614, in some aspects, may include an indication of a power-related characteristic of the EH UE 602 (e.g., as an example of an EH wireless device) including one or more of an energy state, a charging rate profile, or a discharging rate profile. At least one of the charging rate profile or the discharging rate profile, in some aspects, may include at least one of a first rate value associated with a previous time period, a second rate value associated with a current time period, a third rate value associated with a subsequent time period, or a fourth rate value associated with two or more of the previous time period, the current time period, and the subsequent time period. In some aspects, the set of configuration parameters may include an association between particular values for the power-related characteristic of the EH UE 602 and particular parameters in the set of configuration parameters.

The configuration parameter associated with a time-domain resource allocation, in some aspects, may indicate a maximum number of symbols, slots, REs, or frames for an instance, or group of resources, of an active (or activatable) periodic resource set. The configuration parameter associated with a frequency-domain resource allocation, in some aspects, may be a maximum frequency range, or number of subcarriers or REs, for an instance, or group of resources, of a periodic resource set. The configuration parameter associated with a periodicity of a periodic resource set may indicate a minimum period between instances, or groups of resources, in an activated (or activatable) periodic resource set. The configuration parameter associated with a number of data ports or layers may indicate a maximum number of data ports or layers associated with an activated (or activatable) periodic resource set. The configuration parameter associated with a set of MCS values from an MCS table may indicate a maximum and/or minimum MCS value in the MCS table. The MCS table, in some aspects, may be associated with a plurality of MCS tables. The plurality of MCS tables, in some aspects, may include MCS tables corresponding to different ranges of MCS values the wireless device is capable of supporting based on the power-related characteristic of the wireless device. In some aspects, the EH parameters and/or state indication 614 may include an indication of the MCS table related to the set of configuration parameters. In some aspects, the MCS table may be a subset of a larger MCS table (e.g., an MCS table including MCS values selected from a set of MCS values in the larger MCS table).

Based on the UE capability indication 610, the SPS and/or CG configuration 612, and the EH parameters and/or state indication 614, the UE 606 may transmit, and the EH UE 602 may receive, a SL resource activation indication 616 to activate one or more periodic resource sets in the plurality of periodic resource sets configured via SPS and/or CG configuration 612. For example, referring to FIG. 4B, the SL resource activation indication 616 may be transmitted in an activation SL control information (SCI) activating a resource group in a SPS or CG periodic resource set for SL similar to the activation DCI 423 activating at least a periodic resource set including a resource group 424 (e.g., a resource group associated with a DL). In some aspects, the SL resource activation indication 616 may activate multiple periodic resource sets indicated in the SPS and/or CG configuration 612. The SL resource activation indication 616 may include a configuration for each activated periodic resource set from the plurality of periodic resource sets indicated in the SPS and/or CG configuration 612. At least one periodic resource set may be configured with one or more first configuration parameters in the set of configuration parameters. As discussed above the, the activated periodic resource sets may include one or more periodic resource sets associated with SL communication.

Based on the SL resource activation indication 616, data or RS 618 (e.g., data or a reference signal associated with SL communication) may be exchanged between the EH UE 602 and the UE 606. The data or RS 618, in some aspects, may be transmitted via the resources associated with the activated periodic resource set configured with the one or more first configuration parameters in the set of configuration parameters. The resources may be associated with, e.g., the data or RS 618 may be transmitted via, a PSSCH (or PSCCH) and may be associated with a feedback resource. The feedback resource, in some aspects, may be associated with a PSFCH, a PSSCH, or a PSCCH. The feedback resource (e.g., PSFCH) for SL data (e.g., data included in data or RS 618), in some aspects, may be used to transmit HARQ-ACK feedback. In some aspects, the feedback resource associated with SL data (e.g., data included in data or RS 618) may also be used to transmit feedback related to an EH state and/or at least one updated configuration parameter for at least one subsequent resource in the at least one periodic resource set.

The EH UE 602, in some aspects, may transmit feedback 620. Feedback 620, in some aspects, may be transmitted via the feedback resource associated with the data or RS 618. In some aspects, the feedback 620 may be transmitted via a dedicated PSFCH, a PSSCH, a PSCCH, information multiplexed with a CSI report, or information multiplexed with feedback carried on a PSFCH associated with one or more PSSCHs, carried on a SL MAC-CE, or carried on a PSFCH. In some aspects, feedback 620 may be related to the EH state (e.g., may be independent of the reception and/or transmission of the data or RS 618). In some aspects, the feedback 620 may include an indication of a difference between the at least one updated configuration parameter and at least one configuration parameter of the one or more first (e.g., current) configuration parameters. The at least one updated configuration parameter, in some aspects, may include one or more of an updated number of resources, an updated MCS, or an updated periodicity. The updated number of resources, in some aspects, may include at least one of an updated number of resource elements, an updated number of slots, an updated number of symbols, or an updated number of subcarriers. The feedback 620, in some aspects, may be configured to be implemented at a time that is at least a known, or configured, number of time units (e.g., symbols, slots, frames, etc.) after the feedback 620 is transmitted or received. The known, or configured, number of time units may be configured by the base station 604 via an RRC message, a MAC-CE, or SCI (e.g., SCI including the SL resource activation indication 616) or may be indicated in the feedback 620.

The feedback 620 may be transmitted by the EH UE 602 based on a change to one or more of the energy state, the charging rate profile, or the discharging rate profile of the EH UE 602. For example, if the EH UE 602 experiences an increase in a charging rate, an indication of the increased charging rate may be included in the feedback 620. The indicated charging rate, in some aspects, may correspond to a particular value for one or more configuration parameters. For example, a value associated with an increased charging rate may be associated with one or more of a decreased period associated with one or more active periodic resource sets, an increased MCS, or an increased number of resources in each resource group of an activated periodic resource set. Similarly, if the EH UE 602 experiences a decrease in the charging rate, the feedback 620 may include an indication of the decreased charging rate that corresponds to one or more of an increased period associated with one or more active periodic resource sets, a decreased MCS, or a decreased number of resources in each resource group of an activated periodic resource set.

In some aspects, based on the feedback 620, the UE 606 may transmit corresponding feedback 622 to the base station 604 to indicate for the base station 604 to update a CG. The base station 604 may, in response to the feedback 622, transmit, and UE 606 may receive, an updated CG indication 624 indicating an updated set of resources for the UE 606 to use for SL communication with at least EH UE 602. The updated set of resources may include more or fewer resources (e.g., a periodic resource set with a shorter or longer period and/or with more or fewer resources per period). In some aspects, the UE 606 may not need to update a CG from the base station 604 for SL based on the feedback 620. In some aspects, a CG at the UE 606 may include one or more periodic resource sets that can be activated (or deactivated), fully or partially, to implement the configuration indicated by feedback 620. For example, if a periodic set of resources allocated for SL at the UE 606 by the base station 604 is associated with a first period and the feedback 620 indicates a minimum period for resource groups for subsequent SL communication or reference signals (e.g., data or RS 628) that is larger than the first period, the UE 606 may not transmit feedback 622, as the resources allocated by the base station 604 are sufficient to match the updated configuration without additional resource allocation from the base station 604.

In some aspects, the UE 606 may transmit, and the EH UE 602 may receive, an updated configuration 626 (e.g., a reactivation indication) indicating an updated configuration based on the feedback 620. The updated configuration 626 may be transmitted by the UE 606, and received by the EH UE 602, via SCI at a known location (e.g., set of resources) within a subsequent PSSCH or within a known monitoring occasion or search space. The known location, in some aspects, may be configured using an RRC message or a MAC-CE. Based on the configuration parameters indicated and/or included in updated configuration 626, data or RS 628 (e.g., data or a reference signal associated with SL communication) may be exchanged between the EH UE 602 and the UE 606. The data or RS 628, in some aspects, may be transmitted via the resources associated with the activated periodic resource set configured with the updated configuration parameters.

FIG. 7A is a diagram 700 illustrating a plurality of active periodic resource sets being updated in accordance with some aspects of the disclosure. The plurality of periodic resource sets, in some aspects, may be activated by a same activation DCI 702. A first periodic resource set may include a first resource group 704, an associated feedback resource 706 and an UL resource 708 for transmitting an indication of an updated configuration or updated EH state indication. The UL resource 708, in some aspects, may include a change indication 710. The change indication 710, in some aspects, may correspond to feedback 518 of FIG. 5. Accordingly, the change indication 710 may indicate one or more updated configuration parameters. The updated configuration parameters, in some aspects, may be indicated as a change (e.g., a delta) from a configuration parameter used for the first resource group 704.

In some aspects, a DCI 712 may be transmitted and/or received via a set of known or configured resources in a subsequent resource group (e.g., a PDCCH or PDSCH) after a known, or configured, time, $T_{offset}$ 711, following the UL resource 708. The known, or configured, resources and/or $T_{offset}$ 711, in some aspects, may be configured via an RRC message or MAC-CE or may be indicated in the change indication 710. The DCI 712, in some aspects, may include a confirmation of the updated configuration indicated in change indication 710. In some aspects, the DCI 712 indicates the updated configuration parameter and may be applied for at least one subsequent resource group 714 after a time, $T_{offset}$ 713. The updated configuration parameter, in some aspects, may additionally be applied to other active periodic resource set. The other active periodic resource sets, in some aspects, may include each active periodic resource set or a group of periodic resource sets associated with the UL resource 708 (e.g., reference signals or periodic resource sets associated with control or data channels).

Similarly, for a second periodic resource set, a UL resource 718 for transmitting an indication of an updated configuration or updated EH state indication may be provided and/or configured. The UL resource 718 may include a change indication 720. A DCI 722 may be transmitted and/or received via a set of known, or configured, resources or within a known, or configured, monitoring occasion and/or search space after a known, or configured, time, $T_{offset}$ 721, following the UL resource 718. The known, or configured resources, monitoring occasion, search space and/or $T_{offset}$ 721, in some aspects, may be configured via an RRC message or MAC-CE or may be indicated in the change indication 720. The DCI 722, in some aspects, may include a confirmation of the updated configuration indicated in change indication 720. In some aspects, the DCI 712 indicates the updated configuration parameter and may be applied for at least one subsequent resource group after a time, $T_{offset}$ 723. The updated configuration parameter, in some aspects, may additionally be applied to other active periodic resource sets. The other active periodic resource sets, in some aspects, may include each active periodic resource set or a group of periodic resource sets associated with the UL resource 718 (e.g., reference signals or periodic resource sets associated with control or data channels).

FIG. 7B is a diagram 730 illustrating a plurality of active periodic resource sets being updated in accordance with some aspects of the disclosure. The plurality of periodic resource sets, in some aspects, may be activated by a same activation DCI 732. A first periodic resource set may include a first resource group 734 and an associated feedback resource 736. The feedback resource 736, in some aspects, may be used to transmit HARQ-ACK as well as for transmitting an indication of an updated configuration or updated EH state indication. The feedback resource 736, in some aspects, may include a change indication 740. The change indication 740, in some aspects, may correspond to feedback 518 of FIG. 5. Accordingly, the change indication 740 may indicate one or more updated configuration parameters. The updated configuration parameters, in some aspects, may be indicated as a change (e.g., a delta) from a configuration parameter used for the first resource group 734.

In some aspects, a DCI 742 may be transmitted and/or received via a set of known, or configured, resources in a subsequent resource group (e.g., a PDCCH or PDSCH) after a known, or configured, time, $T_{offset}$ 741, following the feedback resource 736. The known, or configured, resources and/or $T_{offset}$ 741, in some aspects, may be configured via an RRC message or MAC-CE or may be indicated in the change indication 740. The DCI 742, in some aspects, may include a confirmation of the updated configuration indicated in change indication 740. In some aspects, the DCI 742 indicates the updated configuration parameter and may be applied for at least one subsequent resource group 744 after a time, $T_{offset}$ 743. The updated configuration parameter, in some aspects, may additionally be applied to other active periodic resource set. The other active periodic resource sets, in some aspects, may include each active periodic resource set or a group of periodic resource sets associated with the feedback resource 736 (e.g., reference signals or periodic resource sets associated with control or data channels).

Similarly, for a second periodic resource set, a feedback resource 748 for transmitting an indication of an updated configuration or updated EH state indication may be provided and/or configured. The feedback resource 748 may include a change indication 750. A DCI 752 may be transmitted and/or received via a set of known, or configured, resources or within a known, or configured, monitoring occasion and/or search space after a known, or configured, time, $T_{offset}$ 751, following the feedback resource 748. The known, or configured resources, monitoring occasion, search space and/or $T_{offset}$ 751, in some aspects, may be configured via an RRC message or MAC-CE or may be indicated in the change indication 750. The DCI 752, in some aspects, may include a confirmation of the updated configuration indicated in change indication 750. In some aspects, the DCI 742 indicates the updated configuration parameter and may be applied for at least one subsequent resource group after a time, $T_{offset}$ 753. The updated configuration parameter, in some aspects, may additionally be applied to other active periodic resource set. The other active periodic resource sets, in some aspects, may include each active periodic resource set or a group of periodic resource sets associated with the feedback resource 748 (e.g., reference signals or periodic resource sets associated with control or data channels).

FIG. 8 is a flowchart 800 of a method of wireless communication. The method may be performed by a wireless device such as a UE (e.g., the UE 104, 502, or 602; the apparatus 1204). At 802, the UE may transmit a first indication of a maximum number of active periodic resource sets of a plurality of periodic resource sets at the wireless device. For example, 802 may be performed by application processor 1206, cellular baseband processor 1224, transceiver(s) 1222, antenna(s) 1280, and/or EH-based adaptive allocation component 198 of FIG. 12. The maximum number of active periodic resource sets, in some aspects, may be based on at least one of a class or a type of the UE (e.g., based on an indication of the class or type of the UE). In some aspects, the plurality of periodic resource sets corresponds to at least one or more of periodic reference signals (e.g., CSI-RS, SRS, or SL-RS) or configured grants for at least one of one or more DL resources, one or more UL resources, or one or more SL resources. The first indication, in some aspects, may be associated with at least one of periodic reference signals (e.g., CSI-RS, SRS, or SL-RS) or an UL periodic resource set, a DL periodic resource set, or a SL periodic resource set associated with a first network-driven mode of resource allocation. In some aspects, the first indication may be transmitted via one of an RRC message or a MAC-CE. If the UE is an EH UE communicating with a base station (e.g., a network node) via DL resources and UL resources, the first indication may be transmitted via a dedicated PUCCH or a PUSCH. The first indication, in some aspects, may be transmitted as information multiplexed with feedback carried on a PUCCH associated with one or more DL transmissions, information multiplexed with a SR, information multiplexed with a buffer state information (e.g., a BSR), or information multiplexed with a random-access message. For example, referring to FIG. 5, the EH UE 502 may transmit UE capability indication 508 indicating a (maximum) number of active periodic resource sets at the EH UE 502.

If the UE is a EH UE communicating with another UE via SL resources, the first indication may be transmitted via one or more of a dedicated PSFCH, a PSSCH, a PSCCH. In some aspects, the first indication may be transmitted as information multiplexed with feedback carried on a PSFCH associated with one or more PSSCHs. For example, referring to FIG. 6, the EH UE 602 may transmit UE capability indication 610 indicating a (maximum) number of active periodic resource sets at the EH UE 602.

At 804, the UE may transmit, based on a power-related characteristic of the UE, a second indication of a set of configuration parameters associated with the plurality of periodic resource sets that are activated during a first time period. For example, 804 may be performed by application processor 1206, cellular baseband processor 1224, transceiver(s) 1222, antenna(s) 1280, and/or EH-based adaptive allocation component 198 of FIG. 12. The set of configuration parameters, in some aspects, may be associated with at least one of a time-domain resource allocation, a frequency-domain resource allocation, a periodicity of a periodic resource set in the plurality of periodic resource sets, number of data ports or layers, or a set of modulation and coding scheme (MCS) values from an MCS table. In some aspects, the MCS table may be associated with a plurality of MCS tables. The plurality of MCS tables, in some aspects, may include MCS tables corresponding to different ranges of MCS values the wireless device is capable of supporting based on the power-related characteristic of the wireless device, and the second indication may include an indication of the MCS table related to the set of configuration parameters.

The second indication, in some aspects, may include an indication of a power-related characteristic of the UE including one or more of an energy state, a charging rate profile, or a discharging rate profile. At least one of the charging rate profile or the discharging rate profile, in some aspects, may include at least one of a first rate value associated with a previous time period, a second rate value associated with a current time period, a third rate value associated with a subsequent time period, or a fourth rate value associated with two or more of the previous time period, the current time period, and the subsequent time period. In some aspects, the set of configuration parameters may include an association between particular values for the power-related characteristic of the UE and particular parameters in the set of configuration parameters. For example, referring to FIGS. 5 and 6, an EH UE 502 or 602 may transmit EH parameters and/or state indication 512 or EH parameters and/or state indication 614, respectively.

At 806, the UE may receive, based on the first indication and the second indication, a third indication of an activation and a configuration for at least one periodic resource set of the plurality of periodic resource sets. For example, 806 may be performed by application processor 1206, cellular baseband processor 1224, transceiver(s) 1222, antenna(s) 1280, and/or EH-based adaptive allocation component 198 of FIG. 12. In some aspects, the at least one periodic resource set is configured with one or more first configuration parameters in the set of configuration parameters. The third indication, in some aspects, may be included in DCI or SCI transmitted, respectively by a base station communicating with the UE or by another UE communicating via SL with the UE. For example, referring to FIGS. 5 and 6, the EH UE 502 or 602 may receive activation indication 514 or SL resource activation indication 616, respectively, including at least one configuration parameter for at least one activated resource.

In some aspects, updates to the configuration may be indicated by the UE and confirmed by a base station (e.g., for DL and UL) or another UE (e.g., for SL resources). For example, the UE may transmit, based on the power-related characteristic of the wireless device, a fourth indication of at least one updated configuration parameter for at least one subsequent resource in the at least one periodic resource set. In some aspects, the at least one periodic resource set includes a plurality of active periodic resource sets and the fourth indication of the at least one updated configuration parameter applies to the plurality of active periodic resource sets. The fourth indication, in some aspects, may be transmitted via a dedicated PUCCH, as information multiplexed with feedback carried on a PUCCH associated with one or more DL transmissions, as information multiplexed with a SR, as information multiplexed with a CSI report, information multiplexed with a buffer state information (e.g., a BSR), as information multiplexed with a random-access message, or via a PUSCH. If the UE is an EH UE communicating with another UE via SL resources, the fourth indication, in some aspects, may be transmitted via at least one of a dedicated PSFCH, a PSSCH, a PSCCH, as information multiplexed with a CSI report, or as information multiplexed with feedback carried on a PSFCH associated with one or more PSSCHs.

The fourth indication of the at least one updated configuration parameter, in some aspects, may include an indication of a difference between the at least one updated configuration parameter and at least one configuration parameter of the one or more first configuration parameters. The at least one updated configuration parameter, in some aspects, may include one or more of an updated number of resources, an updated MCS, or an updated periodicity. The updated number of resources may include at least one of an updated number of resource elements, an updated number of slots, an updated number of symbols, or an updated number of subcarriers. For example, referring to FIGS. 5 and 6, the EH UE 502 or 602 may transmit feedback 518 or feedback 620, respectively, including at least one updated configuration parameter for at least one activated resource.

The UE may receive a fifth indication confirming that the at least one updated configuration parameter corresponds to (e.g., will be applied for) the at least one subsequent resource in the at least one periodic resource set. In some aspects, where the UE communicates with a base station, the fifth indication may be included in DCI via at least one of a known set of resources or a set of resources associated with a monitoring occasion. If the UE is communication via SL resources with another UE, the fifth indication may be included in SCI via at least one of a known set of resources or a set of resources associated with a monitoring occasion. For example, referring to FIGS. 5 and 6, the EH UE 502 or 602 may receive updated configuration 520 or updated configuration 626 indicating an updated configuration based on the feedback 518 or feedback 620, respectively.

Figure 9:
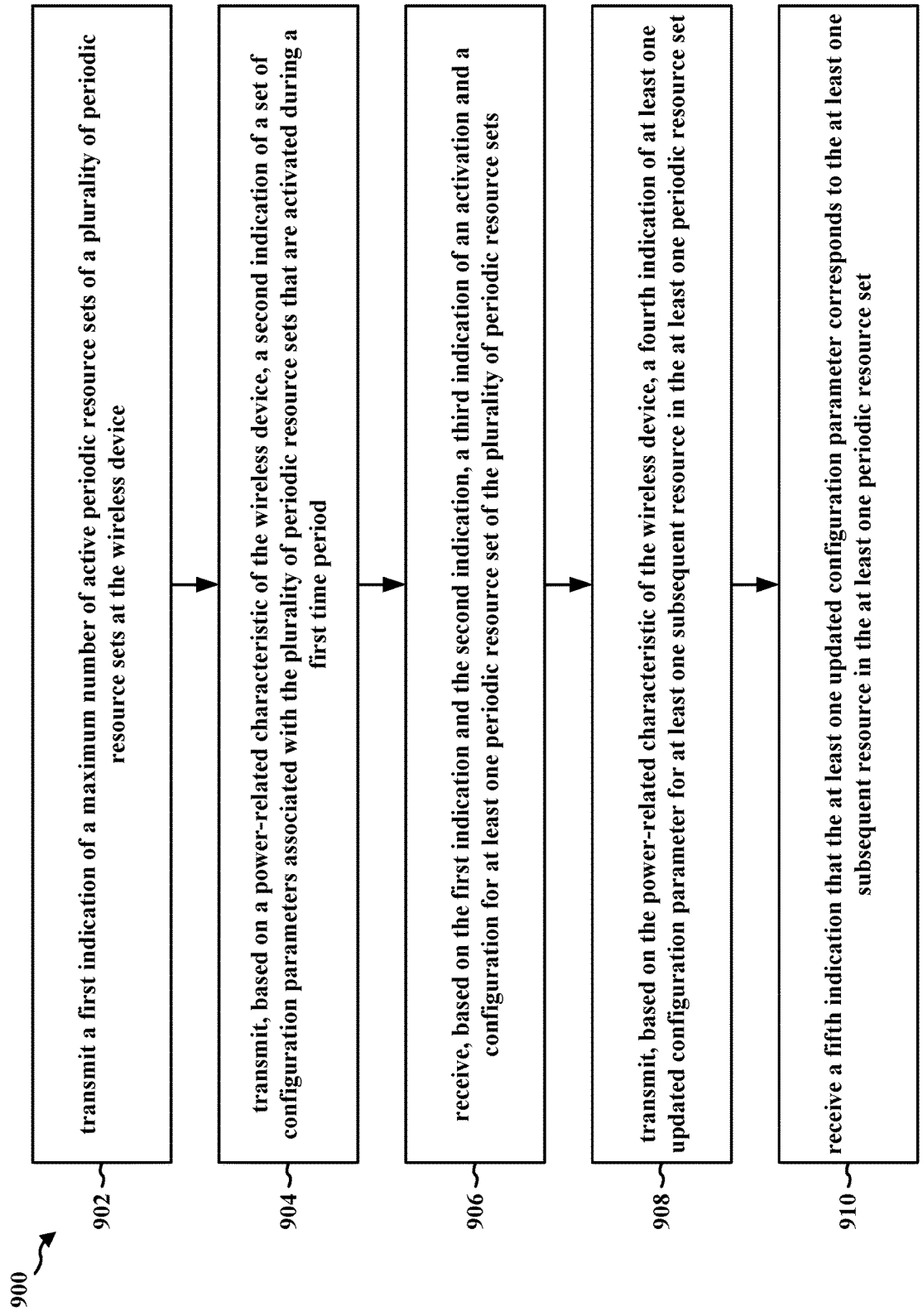
FIG. 9 is a flowchart of a method of wireless communication.

FIG. 9 is a flowchart 900 of a method of wireless communication. The method may be performed by a wireless device such as a UE (e.g., the UE 104, 502, or 602; the apparatus 1204). At 902, the UE may transmit a first indication of a maximum number of active periodic resource sets of a plurality of periodic resource sets at the wireless device. For example, 902 may be performed by application processor 1206, cellular baseband processor 1224, transceiver(s) 1222, antenna(s) 1280, and/or EH-based adaptive allocation component 198 of FIG. 12. The maximum number of active periodic resource sets, in some aspects, may be based on at least one of a class or a type of the UE (e.g., based on an indication of the class or type of the UE). In some aspects, the plurality of periodic resource sets corresponds to at least one or more of periodic reference signals (e.g., CSI-RS, SRS, or SL-RS) or configured grants for at least one of one or more DL resources, one or more UL resources, or one or more SL resources. The first indication, in some aspects, may be associated with at least one of periodic reference signals (e.g., CSI-RS, SRS, or SL-RS) or an UL periodic resource set, a DL periodic resource set, or a SL periodic resource set associated with a first network-driven mode of resource allocation. In some aspects, the first indication may be transmitted via one of an RRC message or a MAC-CE. If the UE is an EH UE communicating with a base station (e.g., a network node) via DL resources and UL resources, the first indication may be transmitted via a dedicated PUCCH or a PUSCH. The first indication, in some aspects, may be transmitted as information multiplexed with feedback carried on a PUCCH associated with one or more DL transmissions, information multiplexed with a SR, information multiplexed with a buffer state information (e.g., a BSR), or information multiplexed with a random-access message. For example, referring to FIG. 5, the EH UE 502 may transmit UE capability indication 508 indicating a (maximum) number of active periodic resource sets at the EH UE 502.

If the UE is a EH UE communicating with another UE via SL resources, the first indication may be transmitted via one or more of a dedicated PSFCH, a PSSCH, a PSCCH. In some aspects, the first indication may be transmitted as information multiplexed with feedback carried on a PSFCH associated with one or more PSSCHs. For example, referring to FIG. 6, the EH UE 602 may transmit UE capability indication 610 indicating a (maximum) number of active periodic resource sets at the EH UE 602.

At 904, the UE may transmit, based on a power-related characteristic of the UE, a second indication of a set of configuration parameters associated with the plurality of periodic resource sets that are activated during a first time period. For example, 904 may be performed by application processor 1206, cellular baseband processor 1224, transceiver(s) 1222, antenna(s) 1280, and/or EH-based adaptive allocation component 198 of FIG. 12. The set of configuration parameters, in some aspects, may be associated with at least one of a time-domain resource allocation, a frequency-domain resource allocation, a periodicity of a periodic resource set in the plurality of periodic resource sets, number of data ports or layers, or a set of modulation and coding scheme (MCS) values from an MCS table. In some aspects, the MCS table may be associated with a plurality of MCS tables. The plurality of MCS tables, in some aspects, may include MCS tables corresponding to different ranges of MCS values the wireless device is capable of supporting based on the power-related characteristic of the wireless device, and the second indication may include an indication of the MCS table related to the set of configuration parameters.

The second indication, in some aspects, may include an indication of a power-related characteristic of the UE including one or more of an energy state, a charging rate profile, or a discharging rate profile. At least one of the charging rate profile or the discharging rate profile, in some aspects, may include at least one of a first rate value associated with a previous time period, a second rate value associated with a current time period, a third rate value associated with a subsequent time period, or a fourth rate value associated with two or more of the previous time period, the current time period, and the subsequent time period. In some aspects, the set of configuration parameters may include an association between particular values for the power-related characteristic of the UE and particular parameters in the set of configuration parameters. For example, referring to FIGS. 5 and 6, an EH UE 502 or 602 may transmit EH parameters and/or state indication 512 or EH parameters and/or state indication 614, respectively.

At 906, the UE may receive, based on the first indication and the second indication, a third indication of an activation and a configuration for at least one periodic resource set of the plurality of periodic resource sets. For example, 906 may be performed by application processor 1206, cellular baseband processor 1224, transceiver(s) 1222, antenna(s) 1280, and/or EH-based adaptive allocation component 198 of FIG. 12. In some aspects, the at least one periodic resource set is configured with one or more first configuration parameters in the set of configuration parameters. The third indication, in some aspects, may be included in DCI or SCI transmitted, respectively by a base station communicating with the UE or by another UE communicating via SL with the UE. For example, referring to FIGS. 5 and 6, the EH UE 502 or 602 may receive activation indication 514 or SL resource activation indication 616, respectively, including at least one configuration parameter for at least one activated resource.

At 908, the UE may transmit, based on the power-related characteristic of the wireless device, a fourth indication of at least one updated configuration parameter for at least one subsequent resource in the at least one periodic resource set. For example, 908 may be performed by application processor 1206, cellular baseband processor 1224, transceiver(s) 1222, antenna(s) 1280, and/or EH-based adaptive allocation component 198 of FIG. 12. In some aspects, the at least one periodic resource set includes a plurality of active periodic resource sets and the fourth indication of the at least one updated configuration parameter applies to the plurality of active periodic resource sets. The fourth indication, in some aspects, may be transmitted via a dedicated PUCCH, as information multiplexed with feedback carried on a PUCCH associated with one or more DL transmissions, as information multiplexed with a SR, as information multiplexed with a CSI report, information multiplexed with a buffer state information (e.g., a BSR), as information multiplexed with a random-access message, or via a PUSCH. If the UE is an EH UE communicating with another UE via SL resources, the fourth indication, in some aspects, may be transmitted via at least one of a dedicated PSFCH, a PSSCH, a PSCCH, as information multiplexed with a CSI report, or as information multiplexed with feedback carried on a PSFCH associated with one or more PSSCHs.

The fourth indication of the at least one updated configuration parameter, in some aspects, may include an indication of a difference between the at least one updated configuration parameter and at least one configuration parameter of the one or more first configuration parameters. The at least one updated configuration parameter, in some aspects, may include one or more of an updated number of resources, an updated MCS, or an updated periodicity. The updated number of resources may include at least one of an updated number of resource elements, an updated number of slots, an updated number of symbols, or an updated number of subcarriers. For example, referring to FIGS. 5 and 6, the EH UE 502 or 602 may transmit feedback 518 or feedback 620, respectively, including at least one updated configuration parameter for at least one activated resource.

Finally, at 910, the UE may receive a fifth indication that the at least one updated configuration parameter corresponds to (e.g., will be applied for) the at least one subsequent resource in the at least one periodic resource set. For example, 910 may be performed by application processor 1206, cellular baseband processor 1224, transceiver(s) 1222, antenna(s) 1280, and/or EH-based adaptive allocation component 198 of FIG. 12. In some aspects, where the UE communicates with a base station, the fifth indication may be included in DCI via at least one of a known set of resources or a set of resources associated with a monitoring occasion. If the UE is communication via SL resources with another UE, the fifth indication may be included in SCI via at least one of a known set of resources or a set of resources associated with a monitoring occasion. For example, referring to FIGS. 5 and 6, the EH UE 502 or 602 may receive updated configuration 520 or updated configuration 626 indicating an updated configuration based on the feedback 518 or feedback 620, respectively.

Figure 10:
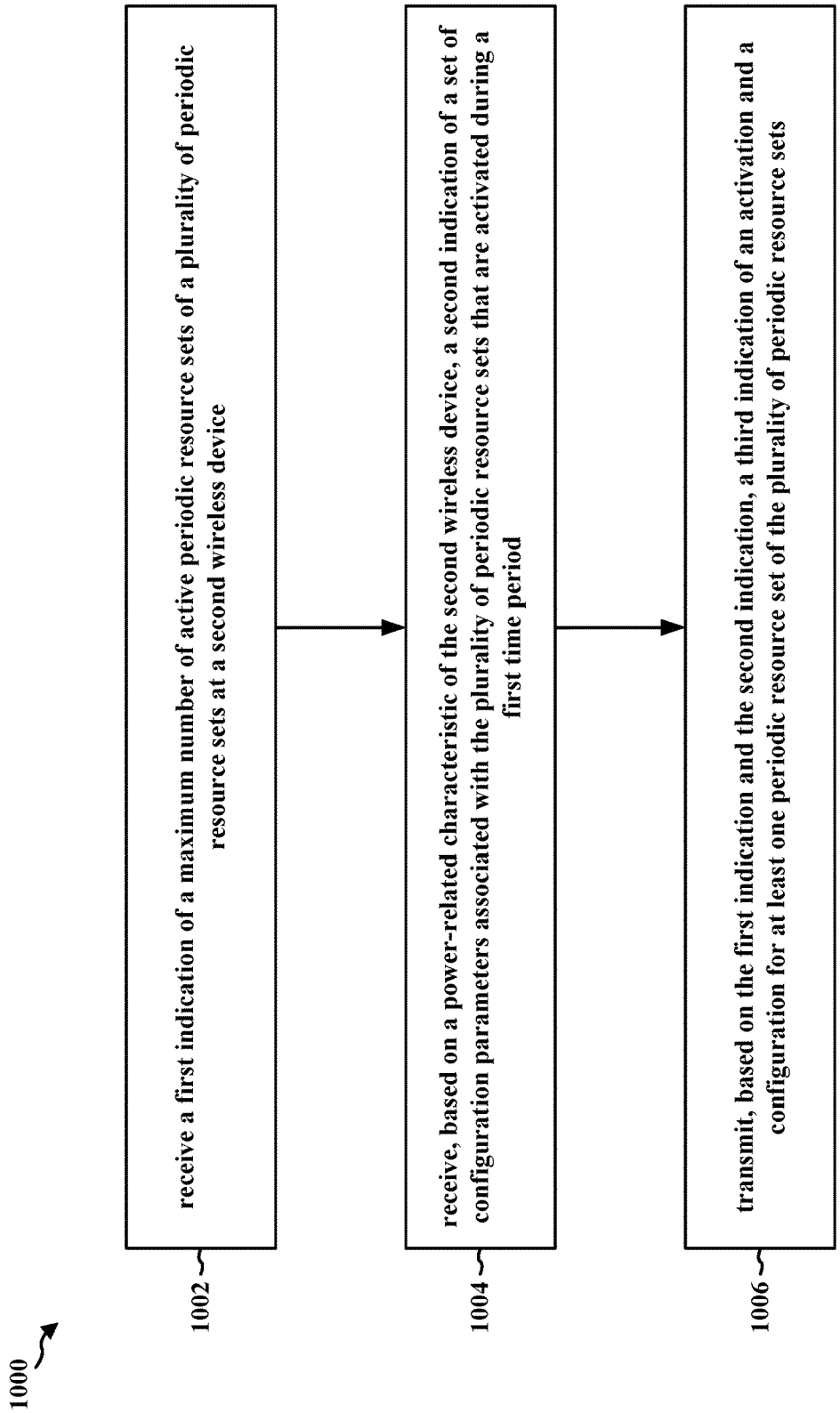
FIG. 10 is a flowchart of a method of wireless communication.

FIG. 10 is a flowchart 1000 of a method of wireless communication. The method may be performed by a first wireless device such as a UE (e.g., the UE 104, 502, or 602; the apparatus 1204) or a base station (e.g., the base station 102 or 504; the network entity 1302). At 1002, the first wireless device may receive a first indication of a maximum number of active periodic resource sets of a plurality of periodic resource sets at a second wireless device. For example, 1002 may be performed by application processor 1206, cellular baseband processor 1224, transceiver(s) 1222, antenna(s) 1280, and/or EH-based adaptive allocation component 198 of FIG. 12 or by CU processor 1312, DU processor 1332, RU processor 1342, transceiver(s) 1346, antenna(s) 1380, and/or EH-based adaptive allocation component 199 of FIG. 13. The maximum number of active periodic resource sets, in some aspects, may be based on at least one of a class or a type of the first wireless device (e.g., based on an indication of the class or type of the first wireless device). In some aspects, the plurality of periodic resource sets corresponds to at least one or more of periodic reference signals (e.g., CSI-RS, SRS, or SL-RS) or configured grants for at least one of one or more DL resources, one or more UL resources, or one or more SL resources. The first indication, in some aspects, may be associated with at least one of periodic reference signals (e.g., CSI-RS, SRS, or SL-RS) or an UL periodic resource set, a DL periodic resource set, or a SL periodic resource set associated with a first network-driven mode of resource allocation. In some aspects, the first indication may be transmitted via one of an RRC message or a MAC-CE. If the second wireless device is an EH UE and the first wireless device is a base station communicating via DL resources and UL resources, the first indication may be received via a dedicated PUCCH or a PUSCH. The first indication, in some aspects, may be received as information multiplexed with feedback carried on a PUCCH associated with one or more DL transmissions, information multiplexed with a SR, information multiplexed with a buffer state information (e.g., a BSR), or information multiplexed with a random-access message. For example, referring to FIG. 5, the base station 504 may receive UE capability indication 508 indicating a (maximum) number of active periodic resource sets at the EH UE 502.

If the first wireless device is a UE and the second wireless device is a EH UE communicating via SL resources, the first indication may be received via one or more of a dedicated PSFCH, a PSSCH, a PSCCH. In some aspects, the first indication may be received as information multiplexed with feedback carried on a PSFCH associated with one or more PSSCHs. For example, referring to FIG. 6, the base station 604 may receive UE capability indication 610 indicating a (maximum) number of active periodic resource sets at the EH UE 602.

At 1004, the first wireless device may receive, based on a power-related characteristic of the second wireless device, a second indication of a set of configuration parameters associated with the plurality of periodic resource sets that are activated during a first time period. For example, 1004 may be performed by application processor 1206, cellular baseband processor 1224, transceiver(s) 1222, antenna(s) 1280, and/or EH-based adaptive allocation component 198 of FIG. 12 or by CU processor 1312, DU processor 1332, RU processor 1342, transceiver(s) 1346, antenna(s) 1380, and/or EH-based adaptive allocation component 199 of FIG. 13. The set of configuration parameters, in some aspects, may be associated with at least one of a time-domain resource allocation, a frequency-domain resource allocation, a periodicity of a periodic resource set in the plurality of periodic resource sets, number of data ports or layers, or a set of modulation and coding scheme (MCS) values from an MCS table. In some aspects, the MCS table may be associated with a plurality of MCS tables. The plurality of MCS tables, in some aspects, may include MCS tables corresponding to different ranges of MCS values the wireless device is capable of supporting based on the power-related characteristic of the wireless device, and the second indication may include an indication of the MCS table related to the set of configuration parameters.

The second indication, in some aspects, may include an indication of a power-related characteristic of the second wireless device including one or more of an energy state, a charging rate profile, or a discharging rate profile. At least one of the charging rate profile or the discharging rate profile, in some aspects, may include at least one of a first rate value associated with a previous time period, a second rate value associated with a current time period, a third rate value associated with a subsequent time period, or a fourth rate value associated with two or more of the previous time period, the current time period, and the subsequent time period. In some aspects, the set of configuration parameters may include an association between particular values for the power-related characteristic of the second wireless device and particular parameters in the set of configuration parameters. For example, referring to FIGS. 5 and 6, the base station 504 or the UE 606 may receive EH parameters and/or state indication 512 or EH parameters and/or state indication 614, respectively.

At 1006, the first wireless device may transmit, based on the first indication and the second indication, a third indication of an activation and a configuration for at least one periodic resource set of the plurality of periodic resource sets. For example, 1006 may be performed by application processor 1206, cellular baseband processor 1224, transceiver(s) 1222, antenna(s) 1280, and/or EH-based adaptive allocation component 198 of FIG. 12 or by CU processor 1312, DU processor 1332, RU processor 1342, transceiver(s) 1346, antenna(s) 1380, and/or EH-based adaptive allocation component 199 of FIG. 13. In some aspects, the at least one periodic resource set is configured with one or more first configuration parameters in the set of configuration parameters. The third indication, in some aspects, may be included in DCI or SCI transmitted, respectively, by a base station communicating with the first wireless device or by another UE communicating via SL with the first wireless device. For example, referring to FIGS. 5 and 6, the base station 504 or the UE 606 may transmit activation indication 514 or SL resource activation indication 616, respectively, including at least one configuration parameter for at least one activated resource.

In some aspects, updates to the configuration may be indicated by the UE and confirmed by a base station (e.g., for DL and UL) or another UE (e.g., for SL resources). For example, the first wireless device may receive, based on the power-related characteristic of the second wireless device, a fourth indication of at least one updated configuration parameter for at least one subsequent resource in the at least one periodic resource set. In some aspects, the at least one periodic resource set includes a plurality of active periodic resource sets and the fourth indication of the at least one updated configuration parameter applies to the plurality of active periodic resource sets. The fourth indication, in some aspects, may be received via a dedicated PUCCH, as information multiplexed with feedback carried on a PUCCH associated with one or more DL transmissions, as information multiplexed with a SR, as information multiplexed with a CSI report, information multiplexed with a buffer state information (e.g., a BSR), as information multiplexed with a random-access message, or via a PUSCH. If the first wireless device is a UE communicating with an EH UE via SL resources, the fourth indication, in some aspects, may be received via at least one of a dedicated PSFCH, a PSSCH, a PSCCH, as information multiplexed with a CSI report, or as information multiplexed with feedback carried on a PSFCH associated with one or more PSSCHs.

The fourth indication of the at least one updated configuration parameter, in some aspects, may include an indication of a difference between the at least one updated configuration parameter and at least one configuration parameter of the one or more first configuration parameters. The at least one updated configuration parameter, in some aspects, may include one or more of an updated number of resources, an updated MCS, or an updated periodicity. The updated number of resources may include at least one of an updated number of resource elements, an updated number of slots, an updated number of symbols, or an updated number of subcarriers. For example, referring to FIGS. 5 and 6, the base station 504 or the UE 606 may receive feedback 518 or feedback 620, respectively, including at least one updated configuration parameter for at least one activated resource.

The first wireless device may transmit a fifth indication that the at least one updated configuration parameter corresponds to (e.g., will be applied for) the at least one subsequent resource in the at least one periodic resource set. In some aspects, where the first wireless device communicates with a base station, the fifth indication may be included in DCI via at least one of a known set of resources or a set of resources associated with a monitoring occasion. If the first wireless device is communication via SL resources with another UE, the fifth indication may be included in SCI via at least one of a known set of resources or a set of resources associated with a monitoring occasion. For example, referring to FIGS. 5 and 6, the base station 504 or the UE 606 may transmit updated configuration 520 or updated configuration 626 indicating an updated configuration based on the feedback 518 or feedback 620, respectively.

Figure 11:
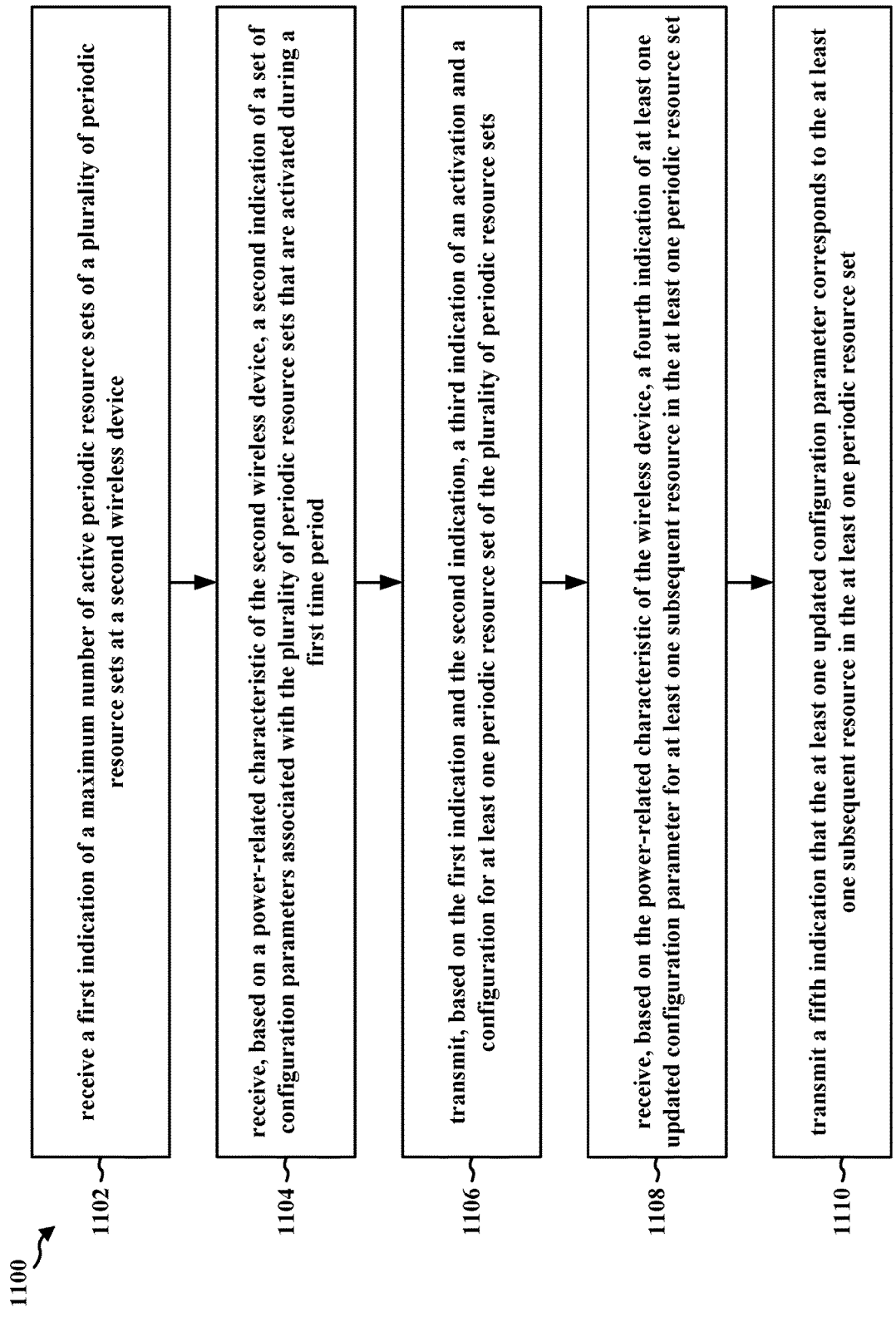
FIG. 11 is a flowchart of a method of wireless communication.

FIG. 11 is a flowchart 1100 of a method of wireless communication. The method may be performed by a first wireless device such as a UE (e.g., the UE 104, 502, or 602; the apparatus 1204) or a base station (e.g., the base station 102 or 504; the network entity 1302). At 1102, the first wireless device may receive a first indication of a maximum number of active periodic resource sets of a plurality of periodic resource sets at a second wireless device. For example, 1102 may be performed by application processor 1206, cellular baseband processor 1224, transceiver(s) 1222, antenna(s) 1280, and/or EH-based adaptive allocation component 198 of FIG. 12 or by CU processor 1312, DU processor 1332, RU processor 1342, transceiver(s) 1346, antenna(s) 1380, and/or EH-based adaptive allocation component 199 of FIG. 13. The maximum number of active periodic resource sets, in some aspects, may be based on at least one of a class or a type of the first wireless device (e.g., based on an indication of the class or type of the first wireless device). In some aspects, the plurality of periodic resource sets corresponds to at least one or more of periodic reference signals (e.g., CSI-RS, SRS, or SL-RS) or configured grants for at least one of one or more DL resources, one or more UL resources, or one or more SL resources. The first indication, in some aspects, may be associated with at least one of periodic reference signals (e.g., CSI-RS, SRS, or SL-RS) or an UL periodic resource set, a DL periodic resource set, or a SL periodic resource set associated with a first network-driven mode of resource allocation. In some aspects, the first indication may be transmitted via one of an RRC message or a MAC-CE. If the second wireless device is an EH UE and the first wireless device is a base station communicating via DL resources and UL resources, the first indication may be received via a dedicated PUCCH or a PUSCH. The first indication, in some aspects, may be received as information multiplexed with feedback carried on a PUCCH associated with one or more DL transmissions, information multiplexed with a SR, information multiplexed with a buffer state information (e.g., a BSR), or information multiplexed with a random-access message. For example, referring to FIG. 5, the base station 504 may receive UE capability indication 508 indicating a (maximum) number of active periodic resource sets at the EH UE 502.

If the first wireless device is a UE and the second wireless device is a EH UE communicating via SL resources, the first indication may be received via one or more of a dedicated PSFCH, a PSSCH, a PSCCH. In some aspects, the first indication may be received as information multiplexed with feedback carried on a PSFCH associated with one or more PSSCHs. For example, referring to FIG. 6, the base station 604 may receive UE capability indication 610 indicating a (maximum) number of active periodic resource sets at the EH UE 602.

At 1104, the first wireless device may receive, based on a power-related characteristic of the second wireless device, a second indication of a set of configuration parameters associated with the plurality of periodic resource sets that are activated during a first time period. For example, 1104 may be performed by application processor 1206, cellular baseband processor 1224, transceiver(s) 1222, antenna(s) 1280, and/or EH-based adaptive allocation component 198 of FIG. 12 or by CU processor 1312, DU processor 1332, RU processor 1342, transceiver(s) 1346, antenna(s) 1380, and/or EH-based adaptive allocation component 199 of FIG. 13. The set of configuration parameters, in some aspects, may be associated with at least one of a time-domain resource allocation, a frequency-domain resource allocation, a periodicity of a periodic resource set in the plurality of periodic resource sets, number of data ports or layers, or a set of modulation and coding scheme (MCS) values from an MCS table. In some aspects, the MCS table may be associated with a plurality of MCS tables. The plurality of MCS tables, in some aspects, may include MCS tables corresponding to different ranges of MCS values the wireless device is capable of supporting based on the power-related characteristic of the wireless device, and the second indication may include an indication of the MCS table related to the set of configuration parameters.

The second indication, in some aspects, may include an indication of a power-related characteristic of the second wireless device including one or more of an energy state, a charging rate profile, or a discharging rate profile. At least one of the charging rate profile or the discharging rate profile, in some aspects, may include at least one of a first rate value associated with a previous time period, a second rate value associated with a current time period, a third rate value associated with a subsequent time period, or a fourth rate value associated with two or more of the previous time period, the current time period, and the subsequent time period. In some aspects, the set of configuration parameters may include an association between particular values for the power-related characteristic of the second wireless device and particular parameters in the set of configuration parameters. For example, referring to FIGS. 5 and 6, the base station 504 or the UE 606 may receive EH parameters and/or state indication 512 or EH parameters and/or state indication 614, respectively.

At 1106, the first wireless device may transmit, based on the first indication and the second indication, a third indication of an activation and a configuration for at least one periodic resource set of the plurality of periodic resource sets. For example, 1106 may be performed by application processor 1206, cellular baseband processor 1224, transceiver(s) 1222, antenna(s) 1280, and/or EH-based adaptive allocation component 198 of FIG. 12 or by CU processor 1312, DU processor 1332, RU processor 1342, transceiver(s) 1346, antenna(s) 1380, and/or EH-based adaptive allocation component 199 of FIG. 13. In some aspects, the at least one periodic resource set is configured with one or more first configuration parameters in the set of configuration parameters. The third indication, in some aspects, may be included in DCI or SCI transmitted, respectively by a base station communicating with the first wireless device or by another UE communicating via SL with the first wireless device. For example, referring to FIGS. 5 and 6, the base station 504 or the UE 606 may transmit activation indication 514 or SL resource activation indication 616, respectively, including at least one configuration parameter for at least one activated resource.

At 1108, the first wireless device may receive, based on the power-related characteristic of the second wireless device, a fourth indication of at least one updated configuration parameter for at least one subsequent resource in the at least one periodic resource set. For example, 1108 may be performed by application processor 1206, cellular baseband processor 1224, transceiver(s) 1222, antenna(s) 1280, and/or EH-based adaptive allocation component 198 of FIG. 12 or by CU processor 1312, DU processor 1332, RU processor 1342, transceiver(s) 1346, antenna(s) 1380, and/or EH-based adaptive allocation component 199 of FIG. 13. In some aspects, the at least one periodic resource set includes a plurality of active periodic resource sets and the fourth indication of the at least one updated configuration parameter applies to the plurality of active periodic resource sets. The fourth indication, in some aspects, may be received via a dedicated PUCCH, as information multiplexed with feedback carried on a PUCCH associated with one or more DL transmissions, as information multiplexed with a SR, as information multiplexed with a CSI report, information multiplexed with a buffer state information (e.g., a BSR), as information multiplexed with a random-access message, or via a PUSCH. If the first wireless device is a UE communicating with an EH UE via SL resources, the fourth indication, in some aspects, may be received via at least one of a dedicated PSFCH, a PSSCH, a PSCCH, as information multiplexed with a CSI report, or as information multiplexed with feedback carried on a PSFCH associated with one or more PSSCHs.

The fourth indication of the at least one updated configuration parameter, in some aspects, may include an indication of a difference between the at least one updated configuration parameter and at least one configuration parameter of the one or more first configuration parameters. The at least one updated configuration parameter, in some aspects, may include one or more of an updated number of resources, an updated MCS, or an updated periodicity. The updated number of resources may include at least one of an updated number of resource elements, an updated number of slots, an updated number of symbols, or an updated number of subcarriers. For example, referring to FIGS. 5 and 6, the base station 504 or the UE 606 may receive feedback 518 or feedback 620, respectively, including at least one updated configuration parameter for at least one activated resource.

Finally, at 1110, the first wireless device may transmit a fifth indication that the at least one updated configuration parameter corresponds to (e.g., will be applied for) the at least one subsequent resource in the at least one periodic resource set. For example, 1110 may be performed by application processor 1206, cellular baseband processor 1224, transceiver(s) 1222, antenna(s) 1280, and/or EH-based adaptive allocation component 198 of FIG. 12 or by CU processor 1312, DU processor 1332, RU processor 1342, transceiver(s) 1346, antenna(s) 1380, and/or EH-based adaptive allocation component 199 of FIG. 13. In some aspects, where the first wireless device communicates with a base station, the fifth indication may be included in DCI via at least one of a known set of resources or a set of resources associated with a monitoring occasion. If the first wireless device is communication via SL resources with another UE, the fifth indication may be included in SCI via at least one of a known set of resources or a set of resources associated with a monitoring occasion. For example, referring to FIGS. 5 and 6, the base station 504 or the UE 606 may transmit updated configuration 520 or updated configuration 626 indicating an updated configuration based on the feedback 518 or feedback 620, respectively.

Figure 12:
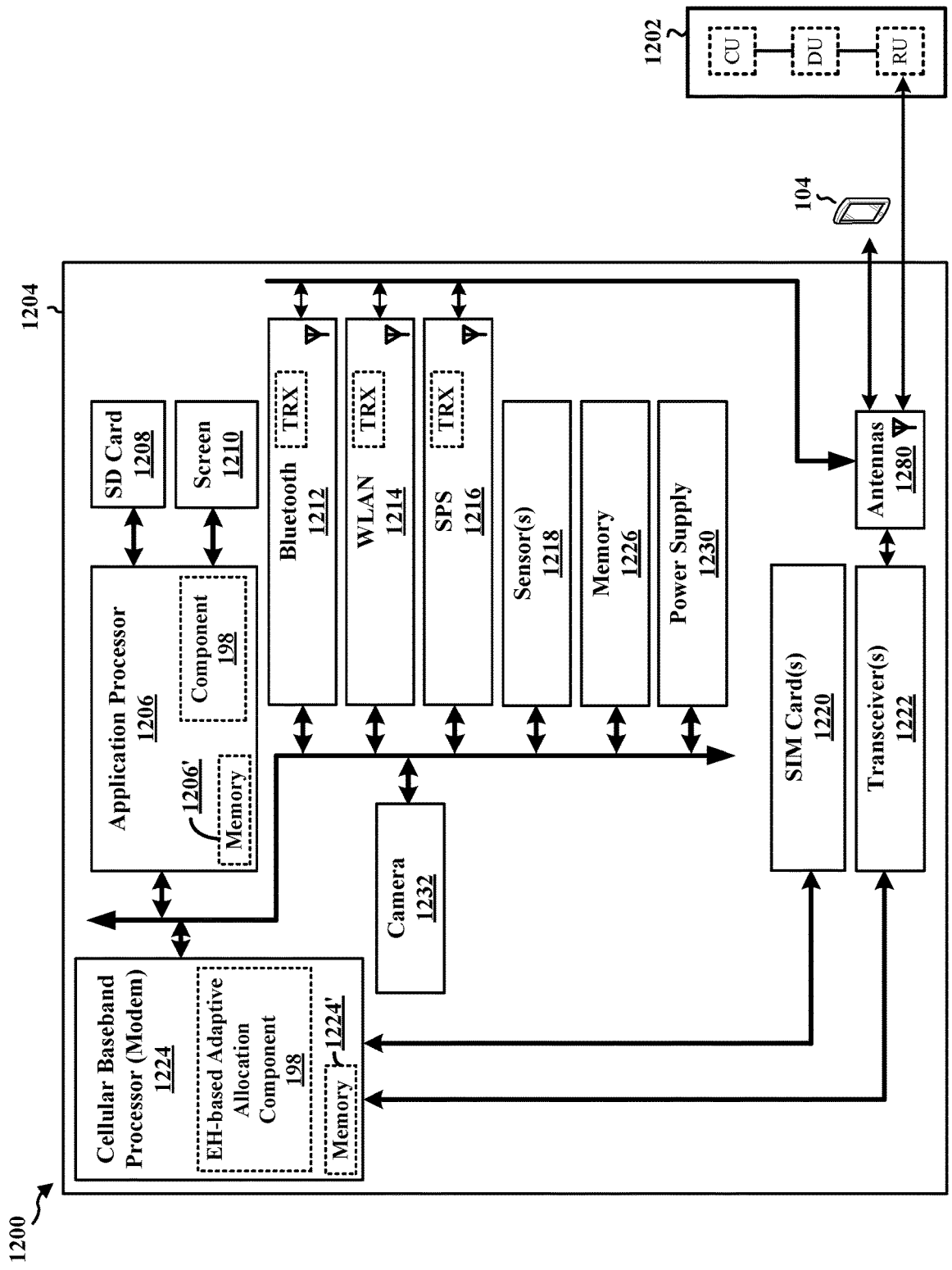
FIG. 12 is a diagram illustrating an example of a hardware implementation for an example network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the EH-based adaptive allocation component 198 is configured to transmit a first indication of a maximum number of active periodic resource sets of a plurality of periodic resource sets at the wireless device, transmit a second indication of a set of configuration parameters associated with the plurality of periodic resource sets that are activated during a first time period based on a power-related characteristic of the wireless device, and receive a third indication of an activation and a configuration for at least one periodic resource set of the plurality of periodic resource sets based on the first indication and the second indication. The EH-based adaptive allocation component 198 may be configured to is configured to receive a first indication of a maximum number of active periodic resource sets of a plurality of periodic resource sets at a second wireless device, receive a second indication of a set of configuration parameters associated with the plurality of periodic resource sets that are activated during a first time period based on a power-related characteristic of the second wireless device, and transmit a third indication of an activation and a configuration for at least one periodic resource set of the plurality of periodic resource sets based on the first indication and the second indication. The EH-based adaptive allocation component 198 may be within the cellular baseband processor 1224, the application processor 1206, or both the cellular baseband processor 1224 and the application processor 1206. The EH-based adaptive allocation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for transmitting a first indication of a maximum number of active periodic resource sets of a plurality of periodic resource sets at the wireless device. The apparatus 1204, and in particular the cellular baseband processor 1224 and/or the application processor 1206, may further include means for transmitting, based on a power-related characteristic of the wireless device, a second indication of a set of configuration parameters associated with the plurality of periodic resource sets that are activated during a first time period. The apparatus 1204, and in particular the cellular baseband processor 1224 and/or the application processor 1206, may further include means for receiving, based on the first indication and the second indication, a third indication of an activation and a configuration for at least one periodic resource set of the plurality of periodic resource sets. The apparatus 1204, and in particular the cellular baseband processor 1224 and/or the application processor 1206, may further include means for transmitting, based on the power-related characteristic of the wireless device, a fourth indication of at least one updated configuration parameter for at least one subsequent resource in the at least one periodic resource set. The apparatus 1204, and in particular the cellular baseband processor 1224 and/or the application processor 1206, may further include means for receiving a fifth indication that the at least one updated configuration parameter corresponds to the at least one subsequent resource in the at least one periodic resource set. The apparatus 1204, and in particular the cellular baseband processor 1224 and/or the application processor 1206, may further include means for receiving a first indication of a maximum number of active periodic resource sets of a plurality of periodic resource sets at a second wireless device. The apparatus 1204, and in particular the cellular baseband processor 1224 and/or the application processor 1206, may further include means for receiving, based on a power-related characteristic of the second wireless device, a second indication of a set of configuration parameters associated with the plurality of periodic resource sets that are activated during a first time period. The apparatus 1204, and in particular the cellular baseband processor 1224 and/or the application processor 1206, may further include means for transmitting, based on the first indication and the second indication, a third indication of an activation and a configuration for at least one periodic resource set of the plurality of periodic resource sets. The apparatus 1204, and in particular the cellular baseband processor 1224 and/or the application processor 1206, may further include means for receiving, based on the power-related characteristic of the second wireless device, a fourth indication of at least one updated configuration parameter for at least one subsequent resource in the at least one periodic resource set. The apparatus 1204, and in particular the cellular baseband processor 1224 and/or the application processor 1206, may further include means for transmit a fifth indication that the at least one updated configuration parameter corresponds to the at least one subsequent resource in the at least one periodic resource set. The means may be the EH-based adaptive allocation component 198 of the apparatus 1204 configured to perform the functions recited by the means or any of the functions describe in relation to FIGS. 8-11. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
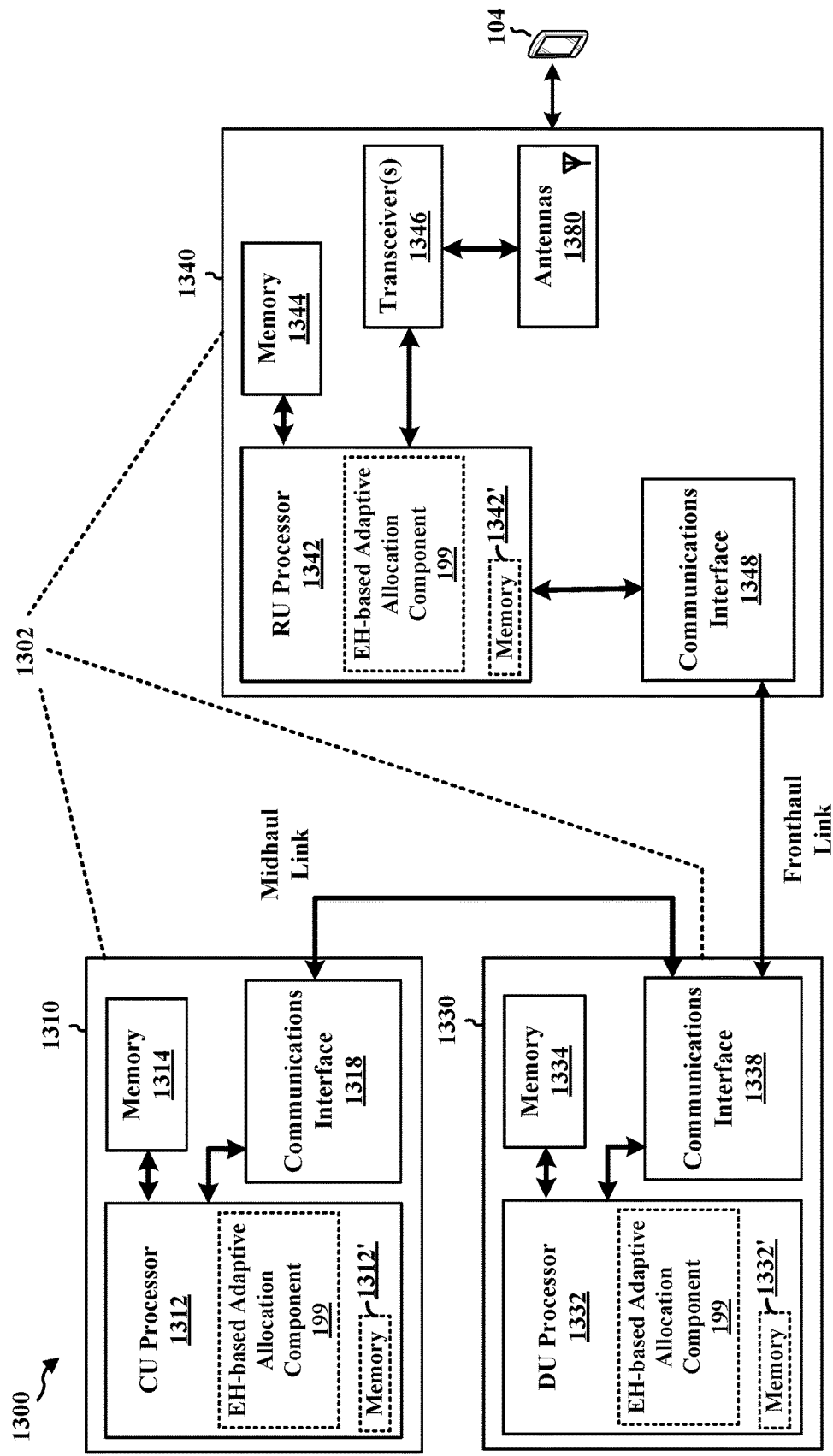
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the EH-based adaptive allocation component 199 is configured to receive a first indication of a maximum number of active periodic resource sets of a plurality of periodic resource sets at a second wireless device, receive a second indication of a set of configuration parameters associated with the plurality of periodic resource sets that are activated during a first time period based on a power-related characteristic of the second wireless device, and transmit a third indication of an activation and a configuration for at least one periodic resource set of the plurality of periodic resource sets based on the first indication and the second indication. The EH-based adaptive allocation component 199 may be within one or more processors of one or more of the CU 1310, DU 1330, and the RU 1340. The EH-based adaptive allocation component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for receiving a first indication of a maximum number of active periodic resource sets of a plurality of periodic resource sets at a second wireless device. The network entity 1302 further may include means for receiving, based on a power-related characteristic of the second wireless device, a second indication of a set of configuration parameters associated with the plurality of periodic resource sets that are activated during a first time period. The network entity 1302 further may include means for transmitting, based on the first indication and the second indication, a third indication of an activation and a configuration for at least one periodic resource set of the plurality of periodic resource sets. The network entity 1302 further may include means for receiving, based on the power-related characteristic of the second wireless device, a fourth indication of at least one updated configuration parameter for at least one subsequent resource in the at least one periodic resource set. The network entity 1302 further may include means for transmitting a fifth indication that the at least one updated configuration parameter corresponds to the at least one subsequent resource in the at least one periodic resource set. The means may be the EH-based adaptive allocation component 199 of the network entity 1302 configured to perform the functions recited by the means or any of the functions describe in relation to FIG. 10 or 11. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

In some aspects of wireless communication, e.g., 5G NR, a wireless device may be capable of harvesting energy. For example, an energy harvesting wireless device may be configured to harvest and store one or more of solar energy, thermal (heat) energy, and/or ambient RF energy. The energy harvested by a wireless device, in some aspects, may be inconsistent such that during a first time period an energy harvesting rate may be a first rate and during a second time period may be a different (e.g., higher or lower) energy harvesting rate. The operation of the wireless device, in some aspects, may be associated with a discharging rate (e.g., a rate at which energy is consumed by the wireless device). The power consumption, in some aspects, may be associated with power consuming RF components such as an ADC, a mixer, and/or oscillators.

While the activation, reactivation, cancellation, and release operations discussed above may allow for some level of dynamic control, a method and apparatus are provided that provide additional opportunities for feedback from a UE or other EH wireless device regarding a current EH state (e.g., based on changing EH rates, energy discharging rates, or amount of stored energy) to provide additional dynamic control capabilities to adjust resources associated with a communication between a EH UE and a base station or other UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including transmitting a first indication of a maximum number of active periodic resource sets of a plurality of periodic resource sets at the wireless device, transmitting, based on a power-related characteristic of the wireless device, a second indication of a set of configuration parameters associated with the plurality of periodic resource sets that are activated during a first time period, and receiving, based on the first indication and the second indication, a third indication of an activation and a configuration for at least one periodic resource set of the plurality of periodic resource sets.

Aspect 2 is the method of aspect 1, where the plurality of periodic resource sets corresponds to at least one or more of periodic reference signals or configured grants for at least one of one or more DL resources, one or more UL resources, or one or more SL resources.

Aspect 3 is the method of any of aspects 1 and 2, where the set of configuration parameters is associated with at least one of a time-domain resource allocation, a frequency-domain resource allocation, a periodicity of a periodic resource set in the plurality of periodic resource sets, number of data ports or layers, or a set of MCS values from an MCS table.

Aspect 4 is the method of aspect 3, where the MCS table is associated with a plurality of MCS tables, where the plurality of MCS tables includes MCS tables corresponding to different ranges of MCS values the wireless device is capable of supporting based on the power-related characteristic of the wireless device, and where the second indication includes an indication of the MCS table related to the set of configuration parameters.

Aspect 5 is the method of any of aspects 1 to 4, where the maximum number of active periodic resource sets is based on at least one of a class or a type of the wireless device.

Aspect 6 is the method of any of aspects 1 to 5, where the power-related characteristic of the wireless device includes one or more of an energy state, a charging rate profile, or a discharging rate profile.

Aspect 7 is the method of aspect 6, where at least one of the charging rate profile or the discharging rate profile includes at least one of a first rate value associated with a previous time period, a second rate value associated with a current time period, a third rate value associated with a subsequent time period, or a fourth rate value associated with the previous time period, the current time period, and the subsequent time period.

Aspect 8 is the method of any of aspects 1 to 7, where the first indication is associated with at least one of an UL periodic resource set, a DL periodic resource set, or a SL periodic resource set associated with a first network-driven mode of resource allocation, and where transmitting the first indication includes transmitting the first indication via one of a RRC message, a MAC-CE, a dedicated PUCCH, information multiplexed with feedback carried on a PUCCH associated with one or more DL transmissions, information multiplexed with a SR, information multiplexed with a buffer state information, information multiplexed with a random-access message, or a PUSCH.

Aspect 9 is the method of any of aspects 1 to 7, where the first indication is associated with a SL periodic resource set, and where the first indication is transmitted via one of an RRC message, a MAC-CE, a dedicated PSFCH, a PSSCH, a PSCCH, or information multiplexed with feedback carried on a PSFCH associated with one or more PSSCHs.

Aspect 10 is the method of any of aspects 1 to 9, where the at least one periodic resource set is configured with one or more first configuration parameters in the set of configuration parameters, the method further including transmitting, based on the power-related characteristic of the wireless device, a fourth indication of at least one updated configuration parameter for at least one subsequent resource in the at least one periodic resource set.

Aspect 11 is the method of aspect 10, where the at least one periodic resource set includes a plurality of active periodic resource sets and the fourth indication of the at least one updated configuration parameter applies to the plurality of active periodic resource sets.

Aspect 12 is the method of any of aspects 10 or 11, where the fourth indication is transmitted via a dedicated PUCCH, information multiplexed with feedback associated with one or more DL transmissions carried on a PUCCH, information multiplexed with a SR, information multiplexed with a CSI report, information multiplexed with a buffer state information, information multiplexed with a random-access message, or a PUSCH.

Aspect 13 is the method of any of aspects 10 to 12, where the fourth indication of the at least one updated configuration parameter includes an indication of a difference between the at least one updated configuration parameter and at least one configuration parameter of the one or more first configuration parameters.

Aspect 14 is the method of any of aspects 10 to 13, where the at least one updated configuration parameter includes one or more of an updated number of resources, an updated MCS, or an updated periodicity, where the updated number of resources includes at least one of an updated number of resource elements, an updated number of slots, an updated number of symbols, or an updated number of subcarriers.

Aspect 15 is the method of any of aspects 10, 11, 13, or 14, where the at least one periodic resource set activated by the third indication is used by the wireless device for SL communication, where the first indication and the second indication are included in at least one of a SL RRC message or a SL MAC-CE, and the fourth indication is included in at least one of a dedicated PSFCH, a PSSCH, a PSCCH, information multiplexed with a CSI report, or information multiplexed with feedback associated with one or more PSSCHs carried on a PSFCH.

Aspect 16 is the method of any of aspects 10 to 14, further including receiving a fifth indication that the at least one updated configuration parameter corresponds to the at least one subsequent resource in the at least one periodic resource set, where the fifth indication is included in DCI via at least one of a known set of resources or a set of resources associated with a monitoring occasion.

Aspect 17 is a method of wireless communication at a wireless device, including receiving a first indication of a maximum number of active periodic resource sets of a plurality of periodic resource sets at a second wireless device, receiving, based on a power-related characteristic of the second wireless device, a second indication of a set of configuration parameters associated with the plurality of periodic resource sets that are activated during a first time period, and transmitting, based on the first indication and the second indication, a third indication of an activation and a configuration for at least one periodic resource set of the plurality of periodic resource sets.

Aspect 18 is the method of aspect 17, where the plurality of periodic resource sets corresponds to at least one or more of periodic reference signals or configured grants for at least one of one or more DL resources, one or more UL resources, or one or more SL resources.

Aspect 19 is the method of any of aspects 17 and 18, where the set of configuration parameters is associated with at least one of a time-domain resource allocation, a frequency-domain resource allocation, a periodicity of a periodic resource set in the plurality of periodic resource sets, number of data ports or layers, or a set of MCS values from an MCS table.

Aspect 20 is the method of aspect 19, where the MCS table is associated with a plurality of MCS tables, where the plurality of MCS tables includes MCS tables corresponding to different ranges of MCS values the wireless device is capable of supporting based on the power-related characteristic of the wireless device, and where the second indication includes an indication of the MCS table related to the set of configuration parameters.

Aspect 21 is the method of any of aspects 17 to 20, where the power-related characteristic of the second wireless device includes one or more of an energy state, a charging rate profile, or a discharging rate profile.

Aspect 22 is the method of aspect 21, where at least one of the charging rate profile or the discharging rate profile includes at least one of a first rate value associated with a previous time period, a second rate value associated with a current time period, a third rate value associated with a subsequent time period, or a fourth rate value associated with the previous time period, the current time period, and the subsequent time period.

Aspect 23 is the method of any of aspects 17 to 22, where the first indication is associated with at least one of an UL periodic resource set, a DL periodic resource set, or a SL periodic resource set associated with a first network-driven mode of resource allocation, and where transmitting the first indication includes transmitting the first indication via one of a RRC message, a MAC-CE, a dedicated PUCCH, information multiplexed with feedback carried on a PUCCH associated with one or more DL transmissions, information multiplexed with a SR, information multiplexed with a buffer state information, information multiplexed with a random-access message, or a PUSCH.

Aspect 24 is the method of any of aspects 17 to 22, where the first indication is associated with a SL periodic resource set, and where the first indication includes transmitting the first indication via one of an RRC message, a MAC-CE, a dedicated PSFCH, a PSSCH, a PSCCH, or information multiplexed with feedback carried on a PSFCH associated with one or more PSSCHs.

Aspect 25 is the method of any of aspects 17 to 24, where the at least one periodic resource set is configured with one or more first configuration parameters in the set of configuration parameters, the method further including receiving, based on the power-related characteristic of the wireless device, a fourth indication of at least one updated configuration parameter for at least one subsequent resource in the at least one periodic resource set.

Aspect 26 is the method of aspect 25, where the at least one periodic resource set includes a plurality of active periodic resource sets and the fourth indication of the at least one updated configuration parameter applies to the plurality of active periodic resource sets.

Aspect 27 is the method of any of aspects 25 or 26, where the fourth indication is received via a dedicated PUCCH, information multiplexed with feedback associated with one or more DL transmissions carried on a PUCCH, information multiplexed with a SR, information multiplexed with a CSI report, information multiplexed with a buffer state information, information multiplexed with a random-access message, or a PUSCH.

Aspect 28 is the method of any of aspects 25 to 27, where the fourth indication of the at least one updated configuration parameter includes an indication of a difference between the at least one updated configuration parameter and at least one configuration parameter of the one or more first configuration parameters.

Aspect 29 is the method of any of aspects 25 to 28, where the at least one updated configuration parameter includes one or more of an updated number of resources, an updated MCS, or an updated periodicity, where the updated number of resources includes at least one of an updated number of resource elements, an updated number of slots, an updated number of symbols, or an updated number of subcarriers.

Aspect 30 is the method of any of aspects 25, 26, 28, or 29, where the at least one periodic resource set activated by the third indication is used by the second wireless device for SL communication, where the first indication and the second indication are included in at least one of a SL RRC message or a SL MAC-CE, and the fourth indication is included in at least one of a dedicated PSFCH, a PSSCH, a PSCCH, information multiplexed with a CSI report, or information multiplexed with feedback associated with one or more PSSCHs carried on a PSFCH.

Aspect 31 is the method of any of aspects 25-29, further including transmitting a fifth indication that the at least one updated configuration parameter corresponds to the at least one subsequent resource in the at least one periodic resource set, where the fifth indication is included in DCI via at least one of a known set of resources or a set of resources associated with a monitoring occasion.

Aspect 32 is an apparatus for wireless communication at a device including a memory and at least one processor coupled to the memory and, based at least in part on information stored in the memory, the at least one processor is configured to implement any of aspects 1 to 31.

Aspect 33 is the apparatus of aspect 32, further including a transceiver or an antenna coupled to the at least one processor.

Aspect 34 is an apparatus for wireless communication at a device including means for implementing any of aspects 1 to 31.

Aspect 35 is a computer-readable medium (e.g., a non-transitory computer-readable medium) storing computer executable code, where the code when executed by a processor causes the processor to implement any of aspects 1 to 31.

What is claimed is:

1. An apparatus for wireless communication at a wireless device, comprising:
    a memory; and
    at least one processor coupled to the memory and, based at least in part on information stored in the memory, the at least one processor is configured to:
        transmit a first indication of a maximum number of active periodic resource sets of a plurality of periodic resource sets at the wireless device;
        transmit, based on a power-related characteristic of the wireless device, a second indication of a set of configuration parameters associated with the plurality of periodic resource sets that are configured to be activated during a first time period; and
        receive, based on the first indication and the second indication, a third indication of an activation and a configuration for at least one periodic resource set of the plurality of periodic resource sets.

2. The apparatus of claim 1, wherein the plurality of periodic resource sets corresponds to at least one or more of periodic reference signals or configured grants for at least one of one or more downlink (DL) resources, one or more uplink (UL) resources, or one or more sidelink (SL) resources.

3. The apparatus of claim 1, wherein the set of configuration parameters is associated with at least one of a time-domain resource allocation, a frequency-domain resource allocation, a periodicity of a periodic resource set in the plurality of periodic resource sets, number of data ports or layers, or a set of modulation and coding scheme (MCS) values from an MCS table.

4. The apparatus of claim 3, wherein the MCS table is associated with a plurality of MCS tables, wherein the plurality of MCS tables comprises MCS tables corresponding to different ranges of MCS values the wireless device is configured to support based on the power-related characteristic of the wireless device, and wherein the second indication comprises an indication of the MCS table related to the set of configuration parameters.

5. The apparatus of claim 1, wherein the maximum number of active periodic resource sets is based on at least one of a class or a type of the wireless device.

6. The apparatus of claim 1, wherein the power-related characteristic of the wireless device comprises one or more of an energy state, a charging rate profile, or a discharging rate profile.

7. The apparatus of claim 6, wherein at least one of the charging rate profile or the discharging rate profile comprises at least one of a first rate value associated with a previous time period, a second rate value associated with a current time period, a third rate value associated with a subsequent time period, or a fourth rate value associated with the previous time period, the current time period, and the subsequent time period.

8. The apparatus of claim 1, wherein the first indication is associated with at least one of an uplink (UL) periodic resource set, a downlink (DL) periodic resource set, or a sidelink (SL) periodic resource set associated with a first network-driven mode of resource allocation, and wherein to transmit the first indication, the at least one processor is configured to transmit the first indication via one of a radio resource control (RRC) message, a medium access control (MAC) control element (CE) (MAC-CE), a dedicated physical UL control channel (PUCCH), information multiplexed with feedback carried on a PUCCH associated with one or more DL transmissions, information multiplexed with a scheduling request (SR), information multiplexed with a buffer state information (BSR), information multiplexed with a random-access message, or a physical UL shared channel (PUSCH).

9. The apparatus of claim 1, wherein the first indication is associated with a sidelink (SL) periodic resource set, and wherein to transmit the first indication, the at least one processor is configured to transmit the first indication via one of a radio resource control (RRC) message, a medium access control (MAC) control element (CE) (MAC-CE), a dedicated physical SL feedback channel (PSFCH), a physical SL shared channel (PSSCH), a physical SL control channel (PSCCH), or information multiplexed with feedback carried on a PSFCH associated with one or more PSSCHs.

10. The apparatus of claim 1, wherein the at least one periodic resource set is configured with one or more first configuration parameters in the set of configuration parameters, the at least one processor further configured to:
    transmit, based on the power-related characteristic of the wireless device, a fourth indication of at least one updated configuration parameter for at least one subsequent resource in the at least one periodic resource set.

11. The apparatus of claim 10, wherein the at least one periodic resource set comprises a plurality of active periodic resource sets and the fourth indication of the at least one updated configuration parameter applies to the plurality of active periodic resource sets.

12. The apparatus of claim 10, wherein to transmit the fourth indication, the at least one processor is configured to transmit the fourth indication via a dedicated physical UL control channel (PUCCH), information multiplexed with feedback associated with one or more DL transmissions carried on a PUCCH, information multiplexed with a scheduling request (SR), information multiplexed with a channel state information (CSI) report, information multiplexed with a buffer state information (BSR), information multiplexed with a random-access message, or a physical uplink shared channel (PUSCH).

13. The apparatus of claim 10, wherein the fourth indication of the at least one updated configuration parameter comprises an indication of a difference between the at least one updated configuration parameter and at least one configuration parameter of the one or more first configuration parameters.

14. The apparatus of claim 10, wherein the at least one updated configuration parameter comprises one or more of an updated number of resources, an updated modulation and coding scheme (MCS), or an updated periodicity, wherein the updated number of resources comprises at least one of an updated number of resource elements, an updated number of slots, an updated number of symbols, or an updated number of subcarriers.

15. The apparatus of claim 10, wherein the at least one periodic resource set that is configured to be activated by the third indication is used by the wireless device for sidelink (SL) communication, wherein the first indication and the second indication are comprised in at least one of a SL radio resource control (RRC) message or a SL medium access control (MAC) control element (CE) (MAC-CE), and the fourth indication is comprised in at least one of a dedicated physical SL feedback channel (PSFCH), a physical SL shared channel (PSSCH), a physical SL control channel (PSCCH), information multiplexed with a channel state information (CSI) report, or information multiplexed with feedback associated with one or more PSSCHs carried on a physical SL feedback channel (PSFCH).

16. The apparatus of claim 10, wherein the at least one processor is further configured to:
receive a fifth indication that the at least one updated configuration parameter corresponds to the at least one subsequent resource in the at least one periodic resource set, wherein the fifth indication is comprised in downlink control information (DCI) via at least one of a known set of resources or a set of resources associated with a monitoring occasion.

17. An apparatus for wireless communication at a first wireless device, comprising:
a memory; and
at least one processor coupled to the memory and, based at least in part on information stored in the memory, the at least one processor is configured to:
receive a first indication of a maximum number of active periodic resource sets of a plurality of periodic resource sets at a second wireless device;
receive, based on a power-related characteristic of the second wireless device, a second indication of a set of configuration parameters associated with the plurality of periodic resource sets that are configured to be activated during a first time period; and
transmit, based on the first indication and the second indication, a third indication of an activation and a configuration for at least one periodic resource set of the plurality of periodic resource sets.

18. The apparatus of claim 17, wherein the plurality of periodic resource sets corresponds to at least one or more of periodic reference signals or configured grants for at least one of one or more downlink (DL) resources, one or more uplink (UL) resources, or one or more sidelink (SL) resources.

19. The apparatus of claim 17, wherein the set of configuration parameters is associated with at least one of a time-domain resource allocation, a frequency-domain resource allocation, a periodicity of a periodic resource set in the plurality of periodic resource sets, number of data ports or layers, or a set of modulation and coding scheme (MCS) values from an MCS table.

20. The apparatus of claim 19, wherein the MCS table is associated with a plurality of MCS tables, wherein the plurality of MCS tables comprises MCS tables corresponding to different ranges of MCS values the second wireless device is configured to support based on the power-related characteristic of the second wireless device, and wherein the second indication comprises an indication of the MCS table related to the set of configuration parameters.

21. The apparatus of claim 17, wherein the power-related characteristic of the second wireless device comprises one or more of an energy state, a charging rate profile, or a discharging rate profile.

22. The apparatus of claim 21, wherein at least one of the charging rate profile or the discharging rate profile comprises at least one of a first rate value associated with a previous time period, a second rate value associated with a current time period, a third rate value associated with a subsequent time period, or a fourth rate value associated with the previous time period, the current time period and the subsequent time period.

23. The apparatus of claim 17, wherein the first indication is associated with at least one of an uplink (UL) physical periodic resource set, a downlink (DL) periodic resource set, or a sidelink (SL) periodic resource set associated with a first network-driven mode of resource allocation, and wherein to receive the first indication, the at least one processor is configured to receive the first indication via one of a radio resource control (RRC) message, a medium access control (MAC) control element (CE) (MAC-CE), a dedicated physical UL control channel (PUCCH), information multiplexed with feedback associated with one or more DL transmissions carried on a PUCCH, information multiplexed with a scheduling request (SR), information multiplexed with a buffer state information (BSR), information multiplexed with a random-access message, or a physical UL shared channel (PUSCH).

24. The apparatus of claim 17, wherein the first indication is associated with a sidelink (SL) periodic resource set, and wherein to receive the first indication, the at least one processor is configured to receive the first indication via one of a radio resource control (RRC) message, a medium access control (MAC) control element (CE) (MAC-CE), a dedicated physical SL feedback channel (PSFCH), a physical SL shared channel (PSSCH), a physical SL control channel (PSCCH), or information multiplexed with feedback carried on a PSFCH associated with one or more PSSCHs.

25. The apparatus of claim 17, wherein the at least one periodic resource set is configured with one or more first configuration parameters in the set of configuration parameters, the at least one processor further configured to:
receive, based on the power-related characteristic of the second wireless device, a fourth indication of at least one updated configuration parameter for at least one subsequent resource in the at least one periodic resource set.

26. The apparatus of claim 25, wherein to receive the fourth indication, the at least one processor is configured to receive the fourth indication via a dedicated physical UL control channel (PUCCH), information multiplexed with feedback associated with one or more DL transmissions carried on a PUCCH, information multiplexed with a scheduling request (SR), information multiplexed with a channel state information (CSI) report, information multiplexed with a buffer state information (BSR), information multiplexed with a random-access message, or a physical UL shared channel (PUSCH).

27. The apparatus of claim 25, wherein the at least one updated configuration parameter comprises one or more of an updated number of resources, an updated modulation and coding scheme (MCS), or an updated periodicity, wherein the updated number of resources comprises at least one of an updated number of resource elements, an updated number of slots, an updated number of symbols, or an updated number of subcarriers.

28. The apparatus of claim 25, wherein the at least one processor is further configured to:
    transmit a fifth indication that the at least one updated configuration parameter corresponds to the at least one subsequent resource in the at least one periodic resource set, wherein the fifth indication is comprised in a downlink control information (DCI) associated with at least one of a known set of resources or a set of resources associated with a monitoring occasion.

29. A method of wireless communication at a wireless device, comprising:
    transmitting a first indication of a maximum number of active periodic resource sets of a plurality of periodic resource sets at the wireless device;
    transmitting, based on a power-related characteristic of the wireless device, a second indication of a set of configuration parameters associated with the plurality of periodic resource sets that are activated during a first time period; and
    receiving, based on the first indication and the second indication, a third indication of an activation and a configuration for at least one periodic resource set of the plurality of periodic resource sets.

30. A method of wireless communication at a first wireless device, comprising:
    receiving a first indication of a maximum number of active periodic resource sets of a plurality of periodic resource sets at a second wireless device;
    receiving, based on a power-related characteristic of the second wireless device, a second indication of a set of configuration parameters associated with the plurality of periodic resource sets that are activated during a first time period; and
    transmitting, based on the first indication and the second indication, a third indication of an activation and a configuration for at least one periodic resource set of the plurality of periodic resource sets.

* * * * *